(12) United States Patent
Milan et al.

(10) Patent No.: US 12,135,750 B2
(45) Date of Patent: Nov. 5, 2024

(54) COMPUTER-IMPLEMENTED SYSTEM AND METHOD FOR ANALYZING CLUSTERS OF CODED DOCUMENTS

(71) Applicant: Nuix North America Inc., Herndon, VA (US)

(72) Inventors: Joe Milan, Mercer Island, WA (US); Eric Robinson, Bellevue, WA (US); David Stromberg, Bellevue, WA (US); Collin Arnold, Redmond, WA (US); Shiow Ju Wu, Bellevue, WA (US)

(73) Assignee: Nuix North America Inc., Herndon, VA (US)

( * ) Notice: Subject to any disclaimer, the term of this patent is extended or adjusted under 35 U.S.C. 154(b) by 0 days.

(21) Appl. No.: 18/230,606

(22) Filed: Aug. 4, 2023

(65) Prior Publication Data

US 2023/0376543 A1    Nov. 23, 2023

Related U.S. Application Data

(63) Continuation of application No. 17/351,949, filed on Jun. 18, 2021, now Pat. No. 11,741,169, which is a (Continued)

(51) Int. Cl.
*G06F 16/00* (2019.01)
*G06F 16/2457* (2019.01)
(Continued)

(52) U.S. Cl.
CPC ........ *G06F 16/93* (2019.01); *G06F 16/24578* (2019.01); *G06F 16/248* (2019.01);
(Continued)

(58) Field of Classification Search
CPC ...... G06F 16/93; G06F 16/35; G06F 16/9535; G06F 16/24578; G06F 16/248; G06F 3/04845
See application file for complete search history.

(56) References Cited

U.S. PATENT DOCUMENTS

| 7,440,622 B2 | 10/2008 | Evans |
| 2008/0270946 A1* | 10/2008 | Risch ..................... G06F 16/34 715/848 |

(Continued)

OTHER PUBLICATIONS

Australian Examination Report No. 1 for Standard Patent Application, Application No. 2017274558, dated Mar. 10, 2021 (4 pages).

(Continued)

*Primary Examiner* — Tyler J Torgrimson
(74) *Attorney, Agent, or Firm* — Nutter McClennen & Fish LLP

(57) ABSTRACT

A computer-implemented system and method for analyzing clusters of coded documents is provided. Clusters of documents are displayed and at least a portion of the documents are each associated with a classification code. A representation of each document is provided based on the associated classification code or an absence of the associated classification code. A search query with search terms is received. Each search term is associated with one of the classification codes. Those documents that satisfy the search query are identified and the representations of the identified documents are changed based on the classification codes associated with the search terms. The change in representation provides an indication of agreement between the classification code of such document and the classification codes of the search terms, or an indication of disagreement between the classification code of the document and the classification codes of the search terms.

20 Claims, 27 Drawing Sheets

Related U.S. Application Data continuation of application No. 15/612,412, filed on Jun. 2, 2017, now Pat. No. 11,068,546.

(60) Provisional application No. 62/344,986, filed on Jun. 2, 2016.

(51) Int. Cl.
| | | |
|---|---|---|
| *G06F 16/248* | (2019.01) | |
| *G06F 16/35* | (2019.01) | |
| *G06F 16/93* | (2019.01) | |
| *G06F 16/9535* | (2019.01) | |
| *G06F 3/04845* | (2022.01) | |

(52) U.S. Cl.
CPC .......... *G06F 16/35* (2019.01); *G06F 16/9535* (2019.01); *G06F 3/04845* (2013.01)

(56) References Cited

U.S. PATENT DOCUMENTS

| 2013/0339275 | A1* | 12/2013 | Knight | G06F 16/358 |
| | | | | 706/11 |
| 2016/0140742 | A1 | 5/2016 | Evans | |
| 2018/0122113 | A1* | 5/2018 | Evans | G06F 18/23 |

OTHER PUBLICATIONS

Australian Examination Report No. 1 for Standard Patent Application, Application No. 2022200809, dated Jan. 25, 2023 (4 pages).
International Search Report and Written Opinion for International Application No. PCT/US2017/035790, mailed Aug. 24, 2017 (14 pages).
Australian Examination Report No. 2 for Standard Patent Application, Application No. 2022200809, dated Aug. 24, 2023 (4 pages).
Australian Examination Report No. 3 for Standard Patent Application, Application No. 2022200809, dated Nov. 9, 2023 (4 pages).
Australian Examination Report No. 4 for Standard Patent Application, Application No. 2022200809, dated Dec. 14, 2023 (4 pages).
European Examination Report for European Application No. 17729719 dated Jan. 27, 2021 (4 pages).
European Summons to attend Oral Proceedings for European Application No. 17729719 dated Nov. 4, 2022 (12 pages).
Gorg, C. et al., "Combining Computation Analyses and Interactive Visualization for Document Exploration and Sensemaking in Jigsaw", IEEE Transaction on Visualization and Computer Graphics, vol. 19, No. 10, Oct. 1, 2013, pp. 1646-1663.
Heer, J., et al. "A Tour Thorugh the Visualization Zoo," Communications of the ACM, 53(6), Jun. 2010, p. 59-67. DOI: 10.1145/1743546.1743567.

* cited by examiner

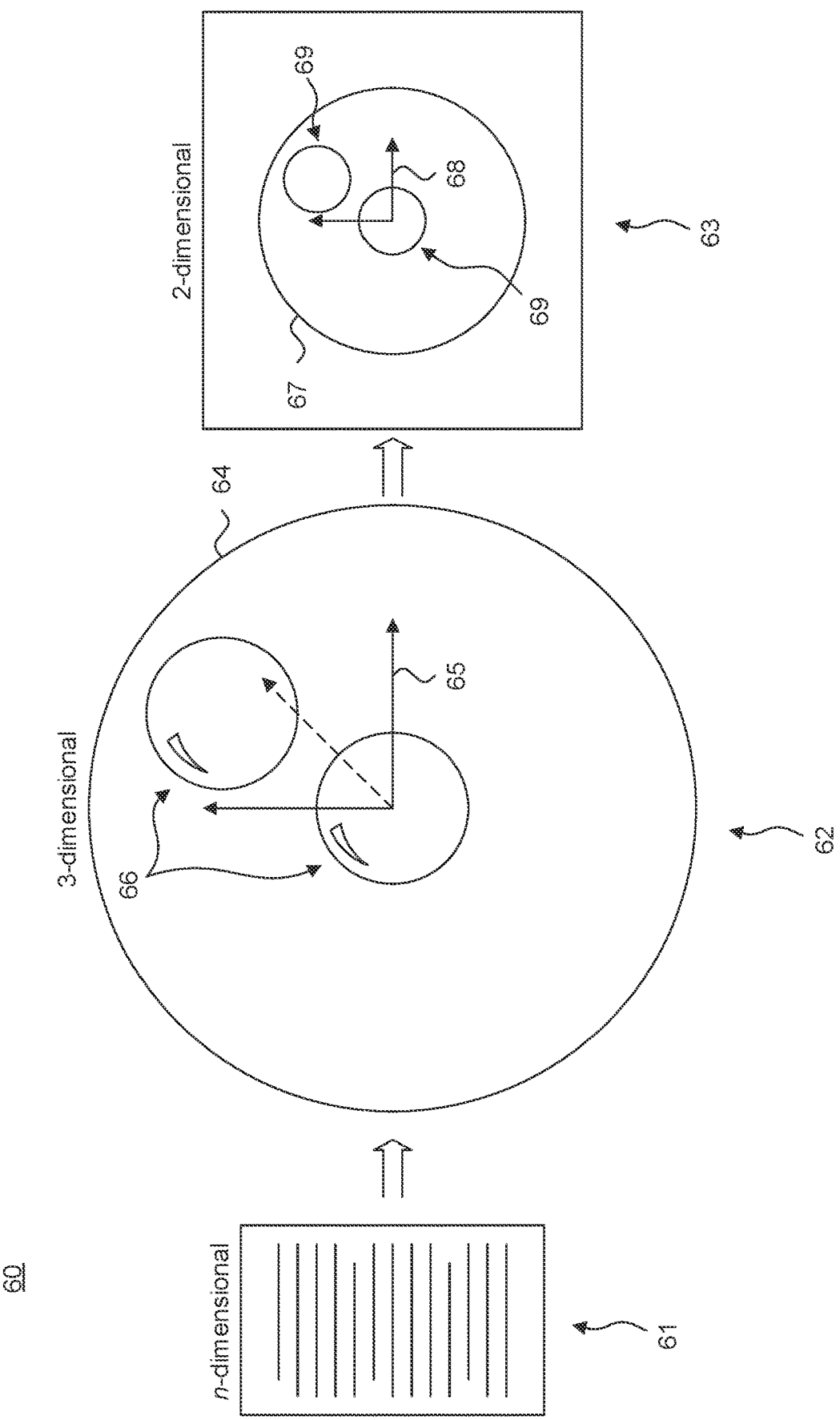

120

150

170

180

190

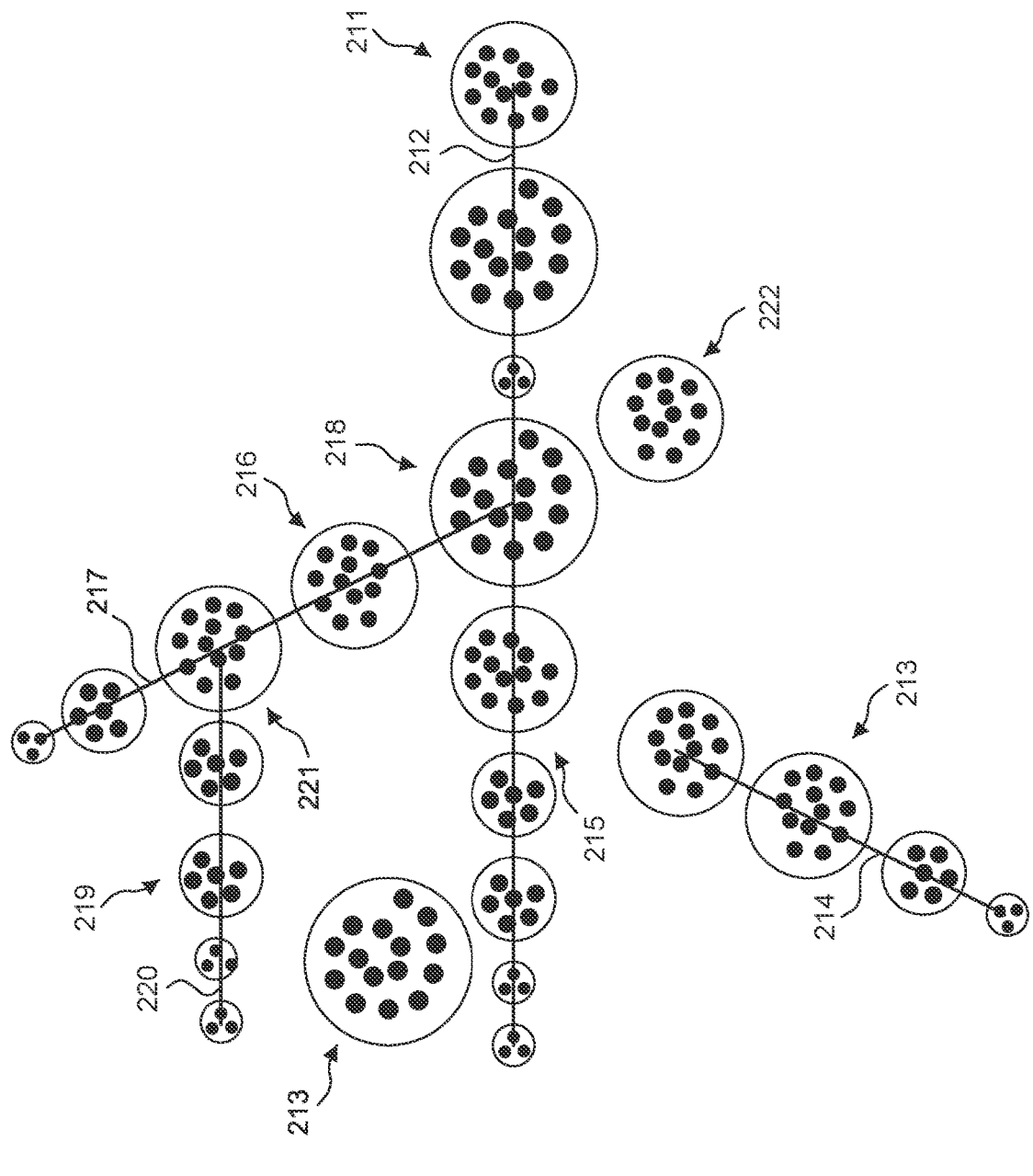

250

260

COMPUTER-IMPLEMENTED SYSTEM AND METHOD FOR ANALYZING CLUSTERS OF CODED DOCUMENTS

CROSS-REFERENCE TO RELATED APPLICATIONS

This patent application is a continuation of U.S. patent application Ser. No. 17/351,949, filed Jun. 18, 2021, which is a continuation of U.S. patent application Ser. No. 15/612,412, filed Jun. 2, 2017, which claims priority under 35 U.S.C. § 119(e) to U.S. Provisional Patent Application, Ser. No. 62/344,986, filed Jun. 2, 2016, the contents of each of which are incorporated by reference.

FIELD

The invention relates in general to user interfaces and, in particular, to a computer-implemented system and method for analyzing clusters of coded documents.

BACKGROUND

Text mining can be used to extract latent semantic content from collections of structured and unstructured text. Data visualization can be used to model the extracted semantic content, which transforms numeric or textual data into graphical data to assist users in understanding underlying semantic principles. For example, clusters group sets of concepts into a graphical element that can be mapped into a graphical screen display. When represented in multi-dimensional space, the spatial orientation of the clusters reflect similarities and relatedness. However, forcibly mapping the display of the clusters into a three-dimensional scene or a two-dimensional screen can cause data misinterpretation. For instance, a viewer could misinterpret dependent relationships between adjacently displayed clusters or erroneously misinterpret dependent and independent variables. As well, a screen of densely-packed clusters can be difficult to understand and navigate, particularly where annotated text labels overlie clusters directly. Other factors can further complicate visualized data perception, such as described in R. E. Horn, "Visual Language: Global Communication for the 21st Century," Ch. 3, MacroVU Press (1998), the disclosure of which is incorporated by reference.

Physically, data visualization is constrained by the limits of the screen display used. Two-dimensional visualized data can be accurately displayed, yet visualized data of greater dimensionality must be artificially projected into two-dimensions when presented on conventional screen displays. Careful use of color, shape and temporal attributes can simulate multiple dimensions, but comprehension and usability become increasingly difficult as additional layers are artificially grafted into the two-dimensional space and screen density increases. In addition, large sets of data, such as email stores, document archives and databases, can be content rich and can yield large sets of clusters that result in a complex graphical representation. Physical display space, however, is limited and large cluster sets can appear crowded and dense, thereby hindering understandability. To aid navigation through the display, the cluster sets can be combined, abstracted or manipulated to simplify presentation, but semantic content can be lost or skewed.

Moreover, complex graphical data can be difficult to comprehend when displayed without textual references to underlying content. The user is forced to mentally note "landmark" clusters and other visual cues, which can be particularly difficult with large cluster sets. Visualized data can be annotated with text, such as cluster labels, to aid comprehension and usability. However, annotating text directly into a graphical display can be cumbersome, particularly where the clusters are densely packed and cluster labels overlay or occlude the screen display. A more subtle problem occurs when the screen is displaying a two-dimensional projection of three-dimensional data and the text is annotated within the two-dimensional space. Relabeling the text based on the two-dimensional representation can introduce misinterpretations of the three-dimensional data when the display is reoriented. Also, reorienting the display can visually shuffle the displayed clusters and cause a loss of user orientation. Furthermore, navigation can be non-intuitive and cumbersome, as cluster placement is driven by available display space and the labels may overlay or intersect placed clusters.

Therefore, there is a need for providing a user interface for focused display of dense visualized three-dimensional data representing extracted semantic content as a combination of graphical and textual data elements. Preferably, the user interface would facilitate convenient navigation through a heads-up display (HUD) logically provided over visualized data and would enable large- or fine-grained data navigation, searching and data exploration.

SUMMARY

An embodiment provides a system and method for providing a user interface for a dense three-dimensional scene. Clusters are placed in a three-dimensional scene arranged proximal to each other such cluster to form a cluster spine. Each cluster includes one or more concepts. Each cluster spine is projected into a two-dimensional display relative to a stationary perspective. Controls operating on a view of the cluster spines in the display are presented. A compass logically framing the cluster spines within the display is provided. A label to identify one such concept in one or more of the cluster spines appearing within the compass is generated. A plurality of slots in the two-dimensional display positioned circumferentially around the compass is defined. Each label is assigned to the slot outside of the compass for the cluster spine having a closest angularity to the slot.

A further embodiment provides a system and method for providing a dynamic user interface for a dense three-dimensional scene with a navigation assistance panel. Clusters are placed in a three-dimensional scene arranged proximal to each other such cluster to form a cluster spine. Each cluster includes one or more concepts. Each cluster spine is projected into a two-dimensional display relative to a stationary perspective. Controls operating on a view of the cluster spines in the display are presented. A compass logically framing the cluster spines within the display is provided. A label is generated to identify one such concept in one or more of the cluster spines appearing within the compass. A plurality of slots in the two-dimensional display is defined positioned circumferentially around the compass. Each label is assigned to the slot outside of the compass for the cluster spine having a closest angularity to the slot. A perspective-altered rendition of the two-dimensional display is generated. The perspective-altered rendition includes the projected cluster spines and a navigation assistance panel framing an area of the perspective-altered rendition corresponding to the view of the cluster spines in the display.

A still further embodiment provides a computer-implemented system and method for analyzing clusters of coded documents. A display of clusters of documents is provided and at least a portion of the documents in the display are each associated with a classification code. A representation of each of the documents is provided within the display based on one of the associated classification code and an absence of the associated classification code. A search query is received and includes one or more search terms. Each search term is associated with one of the classification codes based on the documents. Those documents that satisfy the search query are identified and the representations of the identified documents are changed based on the classification codes associated with one or more of the search terms. The change in representation provides one of an indication of agreement between the classification code associated with one such document and the classification codes of the one or more search terms, and an indication of disagreement between the classification code associated with the document and the classification codes of the search terms.

Still other embodiments of the invention will become readily apparent to those skilled in the art from the following detailed description, wherein are embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

BRIEF DESCRIPTION OF THE DRAWINGS

FIG. 3 is a block diagram showing, by way of example, the projection of n-dimensional space into three-dimensional space and two-dimensional space through the display generator of FIG. 1.

FIG. 9 is a data representation diagram showing, by way of example, a cluster spine group.

DETAILED DESCRIPTION

Glossary

Concept: One or more preferably root stem normalized words defining a specific meaning.
Theme: One or more concepts defining a semantic meaning.
Cluster: Grouping of documents containing one or more common themes.
Spine: Grouping of clusters sharing a single concept preferably arranged linearly along a vector. Also referred to as a cluster spine.
Spine Group: Set of connected and semantically-related spines.
Scene: Three-dimensional virtual world space generated from a mapping of an n-dimensional problem space.
Screen: Two-dimensional display space generated from a projection of a scene limited to one single perspective at a time.

The foregoing terms are used throughout this document and, unless indicated otherwise, are assigned the meanings presented above.

System Overview

Figure 1:
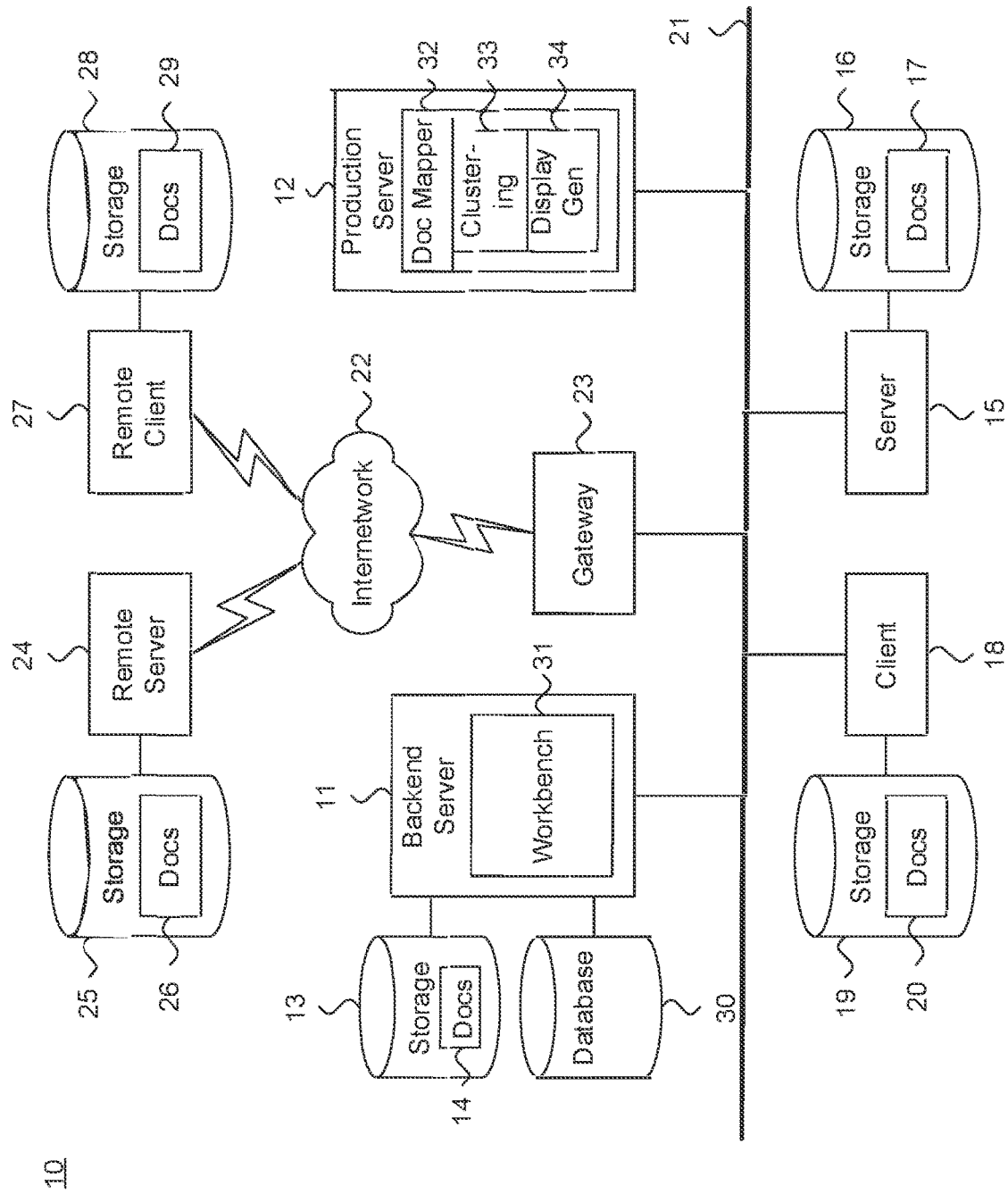
FIG. 1 is a block diagram showing a system for providing a user interface for a dense three-dimensional scene, in accordance with the invention.

FIG. 1 is a block diagram showing a system 10 for providing a user interface for a dense three-dimensional scene, in accordance with the invention. By way of illustration, the system 10 operates in a distributed computing environment, which includes a plurality of heterogeneous systems and document sources. A backend server 11 executes a workbench suite 31 for providing a user interface framework for automated document management, processing and analysis. The backend server 11 is coupled to a storage device 13, which stores documents 14, in the form of structured or unstructured data, and a database 30 for maintaining document information. A production server 12 includes a document mapper 32, that includes a clustering engine 33 and display generator 34. The clustering engine 33 performs efficient document scoring and clustering, such as described in commonly-assigned U.S. Pat. No. 7,610,313, issued Oct. 27, 2009, the disclosure of which is incorporated by reference. The display generator 34 arranges concept clusters in a radial thematic neighborhood relationships projected onto a two-dimensional visual display, such as described in commonly-assigned U.S. Pat. No. 7,191,175, issued Mar. 13, 2007, and U.S. Pat. No. 7,440,622, issued Oct. 21, 2008, the disclosures of which are incorporated by reference. In addition, the display generator 34 provides a user interface for cluster display and navigation, as further described below beginning with reference to FIGS. 2A-B.

The document mapper 32 operates on documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In one embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including backend server 11, production server 32, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Display Generator

Figure 2A:
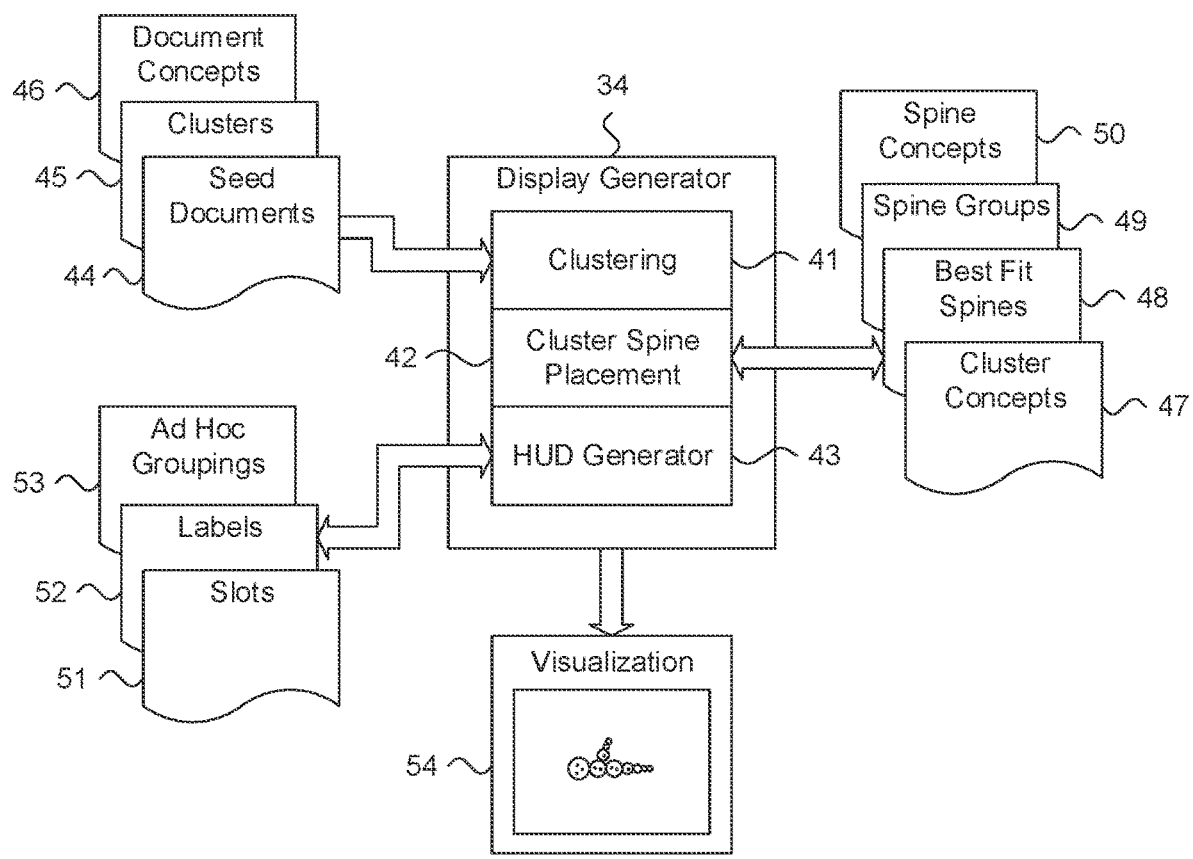
FIGS. 2A-B are block diagrams showing the system modules implementing the display generator of FIG. 1.
Figure 2B:
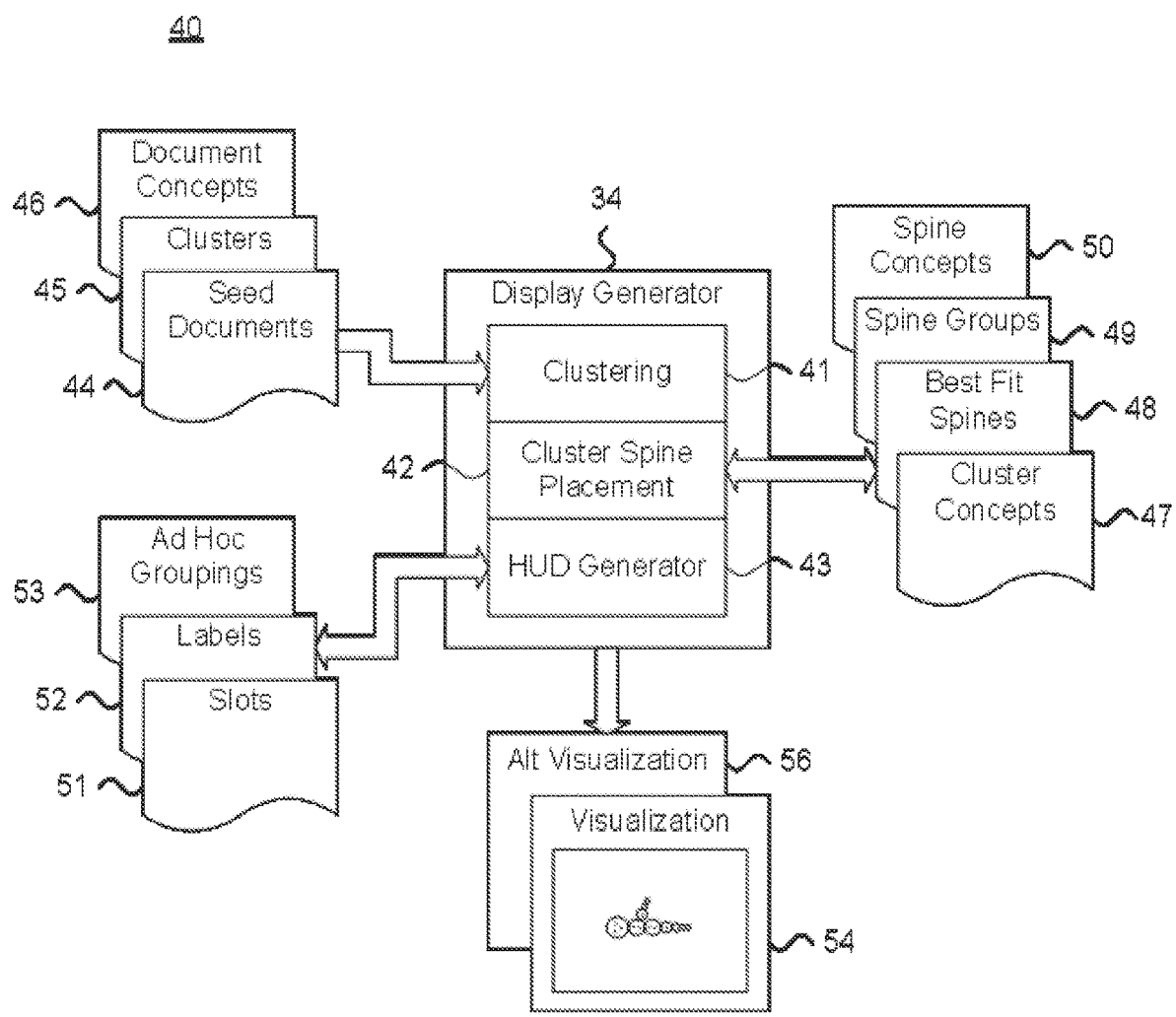

FIGS. 2A-B are block diagrams showing the system modules 40 implementing the display generator of FIG. 1. Referring first to FIG. 2A, the display generator 34 includes clustering 41, cluster spine placement 42, and HUD 43 components.

Individual documents 14 are analyzed by the clustering component 41 to form clusters 45 of semantically scored documents, such as described in commonly-assigned U.S. Pat. No. 7,610,313, issued Oct. 27, 2009, the disclosure of which is incorporated by reference. In one embodiment, document concepts 46 are formed from concepts and terms extracted from the documents 14 and the frequencies of occurrences and reference counts of the concepts and terms are determined. Each concept and term is then scored based on frequency, concept weight, structural weight, and corpus weight. The document concept scores are compressed and assigned to normalized score vectors for each of the documents 14. The similarities between each of the normalized score vectors are determined, preferably as cosine values. A set of candidate seed documents is evaluated to select a set of seed documents 44 as initial cluster centers based on relative similarity between the assigned normalized score vectors for each of the candidate seed documents or using a dynamic threshold based on an analysis of the similarities of the documents 14 from a center of each cluster 45, such as described in commonly-assigned U.S. Pat. No. 7,610,313, issued Oct. 27, 2009, the disclosure of which is incorporated by reference. The remaining non-seed documents are evaluated against the cluster centers also based on relative similarity and are grouped into the clusters 45 based on best-fit, subject to a minimum fit criterion.

The clustering component 41 analyzes cluster similarities in a multi-dimensional problem space, while the cluster spine placement component 42 maps the clusters into a three-dimensional virtual space that is then projected onto a two-dimensional screen space, as further described below with reference to FIG. 3. The cluster spine placement component 42 evaluates the document concepts 46 assigned to each of the clusters 45 and arranges concept clusters in thematic neighborhood relationships projected onto a shaped two-dimensional visual display, such as described in commonly-assigned U.S. Pat. No. 7,191,175, issued Mar. 13, 2007, and U.S. Pat. No. 7,440,622, issued Oct. 21, 2008, the disclosures of which are incorporated by reference.

During visualization, cluster "spines" and certain clusters 45 are placed as cluster groups 49 within a virtual three-dimensional space as a "scene" or world 56 that is then projected into two-dimensional space as a "screen" or visualization 54. Candidate spines are selected by surveying the cluster concepts 47 for each cluster 45. Each cluster concept 47 shared by two or more clusters 45 can potentially form a spine of clusters 45. However, those cluster concepts 47 referenced by just a single cluster 45 or by more than 10% of the clusters 45 are discarded. Other criteria for discarding cluster concepts 47 are possible. The remaining clusters 45 are identified as candidate spine concepts, which each logically form a candidate spine. Each of the clusters 45 are then assigned to a best fit spine 48 by evaluating the fit of each candidate spine concept to the cluster concept 47. The candidate spine exhibiting a maximum fit is selected as the best fit spine 48 for the cluster 45. Unique seed spines are next selected and placed. Spine concept score vectors are generated for each best fit spine 48 and evaluated. Those best fit spines 48 having an adequate number of assigned clusters 45 and which are sufficiently dissimilar to any previously selected best fit spines 48 are designated and placed as seed spines and the corresponding spine concept 50 is identified. Any remaining unplaced best fit spines 48 and clusters 45 that lack best fit spines 48 are placed into spine groups 49. Anchor clusters are selected based on similarities between unplaced candidate spines and candidate anchor clusters. Cluster spines are grown by placing the clusters 45 in similarity precedence to previously placed spine clusters or anchor clusters along vectors originating at each anchor cluster. As necessary, clusters 45 are placed outward or in a new vector at a different angle from new anchor clusters 55. The spine groups 49 are placed by translating the spine groups 49 in a radial manner until there is no overlap, such as described in commonly-assigned U.S. Pat. No. 7,271,804, issued Sep. 18, 2007, the disclosure of which is incorporated by reference.

Finally, the HUD generator 43 generates a user interface, which includes a HUD that logically overlays the spine groups 49 placed within the visualization 54 and which provides controls for navigating, exploring and searching the cluster space, as further described below with reference to FIGS. 4A-C. The HUD is projected over a potentially complex or dense scene, such as the cluster groups 49 projected from the virtual three-dimensional space, and provides labeling and focusing of select clusters. The HUD includes a compass that provides a focused view of the placed spine groups 49, concept labels that are arranged circumferentially and non-overlappingly around the compass, statistics about the spine groups 49 appearing within the compass, and a garbage can in which to dispose of selected concepts. In one embodiment, the compass is round, although other enclosed shapes and configurations are possible. Labeling is provided by drawing a concept pointer from the outermost cluster in select spine groups 49 as determined in the three-dimensional virtual scene to the periphery of the compass at which the label appears. Preferably, each concept pointer is drawn with a minimum length and placed to avoid overlapping other concept pointers. Focus is provided through a set of zoom, pan and pin controls, as further described below with reference to FIGS. 6A-D.

In one embodiment, a single compass is provided. Referring next to FIG. 2B, in a further embodiment, multiple and independent compasses can be provided, as further described below with reference to FIG. 7. A pre-determined number of best fit spines 48 are identified within the three-dimensional virtual scene and labels 52 are assigned based on the number of clusters for each of the projected best fit spines 48 appearing within the compass. A set of wedge-shaped slots 51 are created about the circumference of the compass. The labels are placed into the slots 51 at the end of concept pointers appearing at a minimum distance from the outermost cluster 45 to the periphery of the compass to avoid overlap, as further described below with reference to FIG. 14. In addition, groupings 53 of clusters can be formed by selecting concepts or documents appearing in the compass using the user interface controls. In a still further embodiment, the cluster "spines" and certain clusters 45 are placed as cluster groups 49 within a virtual three-dimensional space as a "scene" or world that is then projected into two-dimensional folder representation or alternate visualization 57, as further described in FIGS. 16 and 17.

Each module or component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The display generator 32 operates in accordance with a sequence of process steps, as further described below with reference to FIG. 11.

Cluster Projection

FIG. 3 is a block diagram 60 showing, by way of example, the projection of n-dimensional space 61 into three-dimensional space 62 and two-dimensional space 63 through the display generator 34 of FIG. 1. Individual documents 14 form an n-dimensional space 61 with each document concept 46 representing a discrete dimension. From a user's point of view, the n-dimensional space 61 is too abstract and dense to conceptualize into groupings of related document concepts 46 as the number of interrelationships between distinct document concepts 46 increases exponentially with the number of document concepts. Comprehension is quickly lost as concepts increase. Moreover, the n-dimensional space 61 cannot be displayed if n exceeds three dimensions. As a result, the document concept interrelationships are mapped into a three-dimensional virtual "world" and then projected onto a two-dimensional screen.

First, the n-dimensional space 61 is projected into a virtual three-dimensional space 62 by logically group the document concepts 46 into thematically-related clusters 45. In one embodiment, the three-dimensional space 62 is conceptualized into a virtual world or "scene" that represents each cluster 45 as a virtual sphere 66 placed relative to other thematically-related clusters 45, although other shapes are possible. Importantly, the three-dimensional space 62 is not displayed, but is used instead to generate a screen view. The three-dimensional space 62 is projected from a pre-defined perspective onto a two-dimensional space 63 by representing each cluster 45 as a circle 69, although other shapes are possible.

Although the three-dimensional space 62 could be displayed through a series of two-dimensional projections that would simulate navigation through the three-dimensional space through yawing, pitching and rolling, comprehension would quickly be lost as the orientation of the clusters 45 changed. Accordingly, the screens generated in the two-dimensional space 63 are limited to one single perspective at a time, such as would be seen by a viewer looking at the three-dimensional space 62 from a stationary vantage point, but the vantage point can be moved. The viewer is able to navigate through the two-dimensional space 63 through zooming and panning. Through the HUD, the user is allowed to zoom and pan through the clusters 45 appearing within compass 67 and pin select document concepts 46 into place onto the compass 67. During panning and zooming, the absolute three-dimensional coordinates 65 of each cluster 45 within the three-dimensional space 64 remain unchanged, while the relative two-dimensional coordinates 68 are updated as the view through the HUD is modified. Finally, spine labels are generated for the thematic concepts of cluster spines appearing within the compass 67 based on the underlying scene in the three-dimensional space 64 and perspective of the viewer, as further described below with reference to FIG. 14.

User Interface Example

Figure 4A:
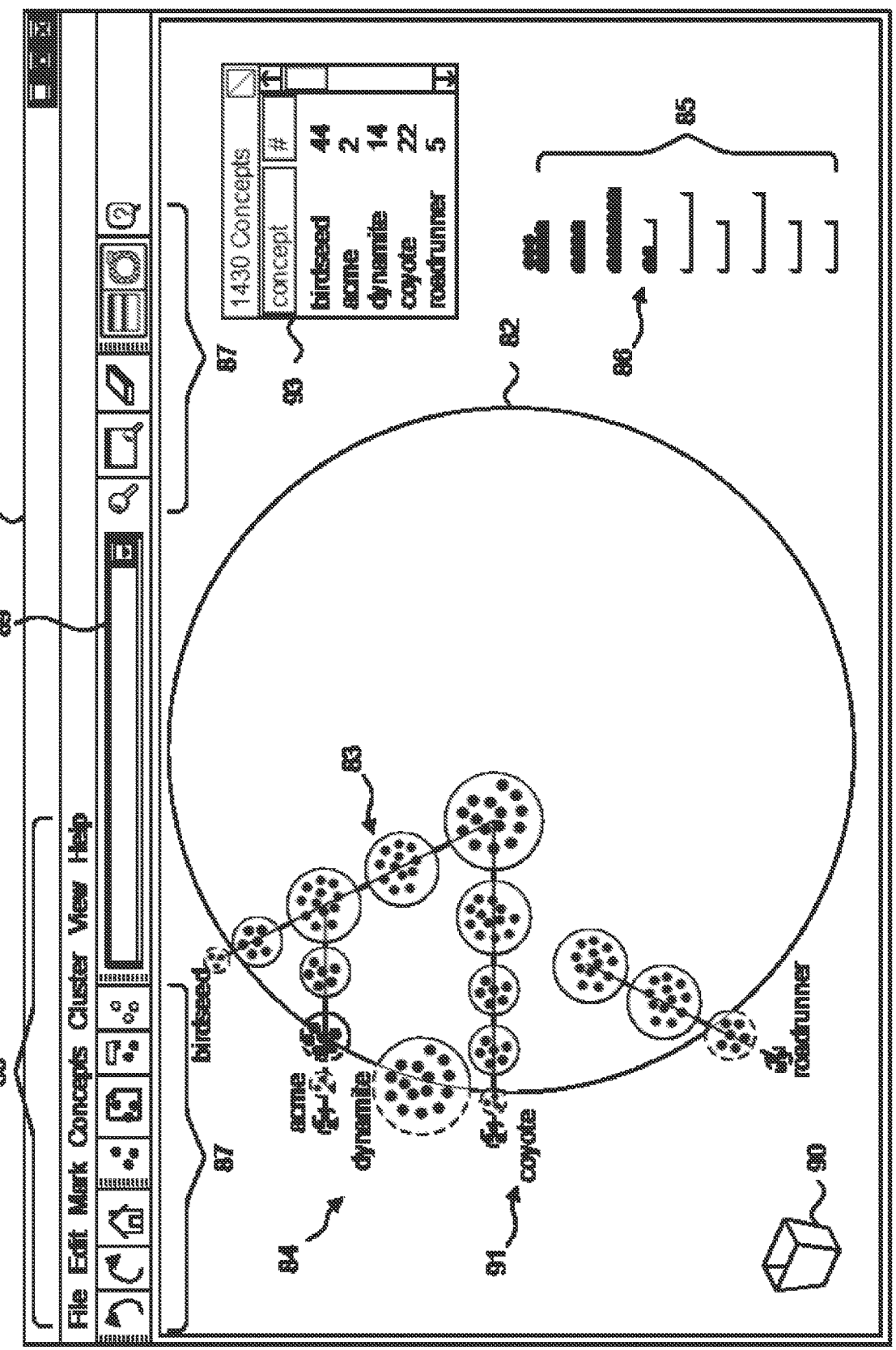
FIGS. 4A-C are screen display diagrams showing, by way of example, a user interface generated by the display generator of FIG. 1.
Figure 4B:
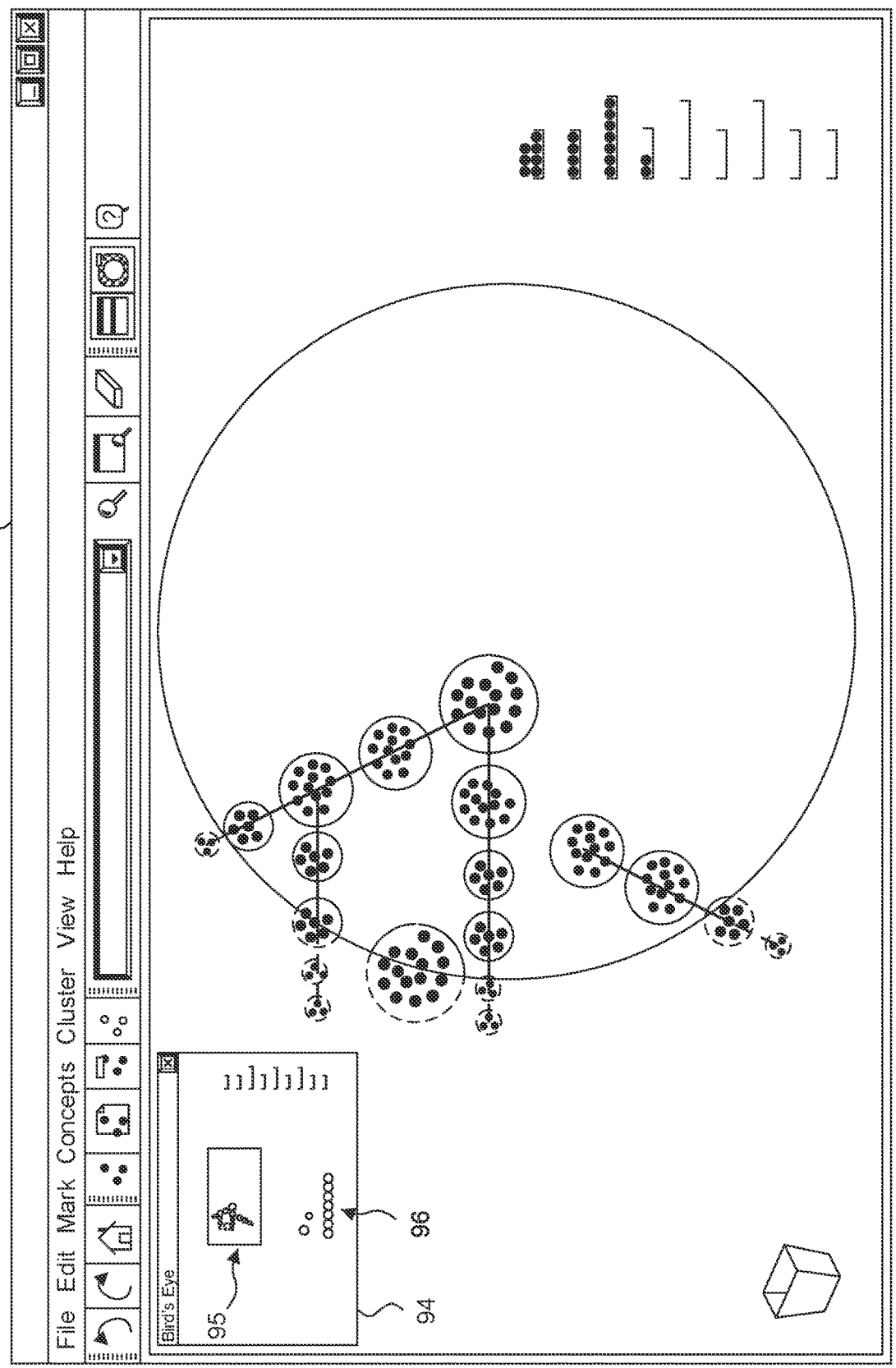
Figure 4C:
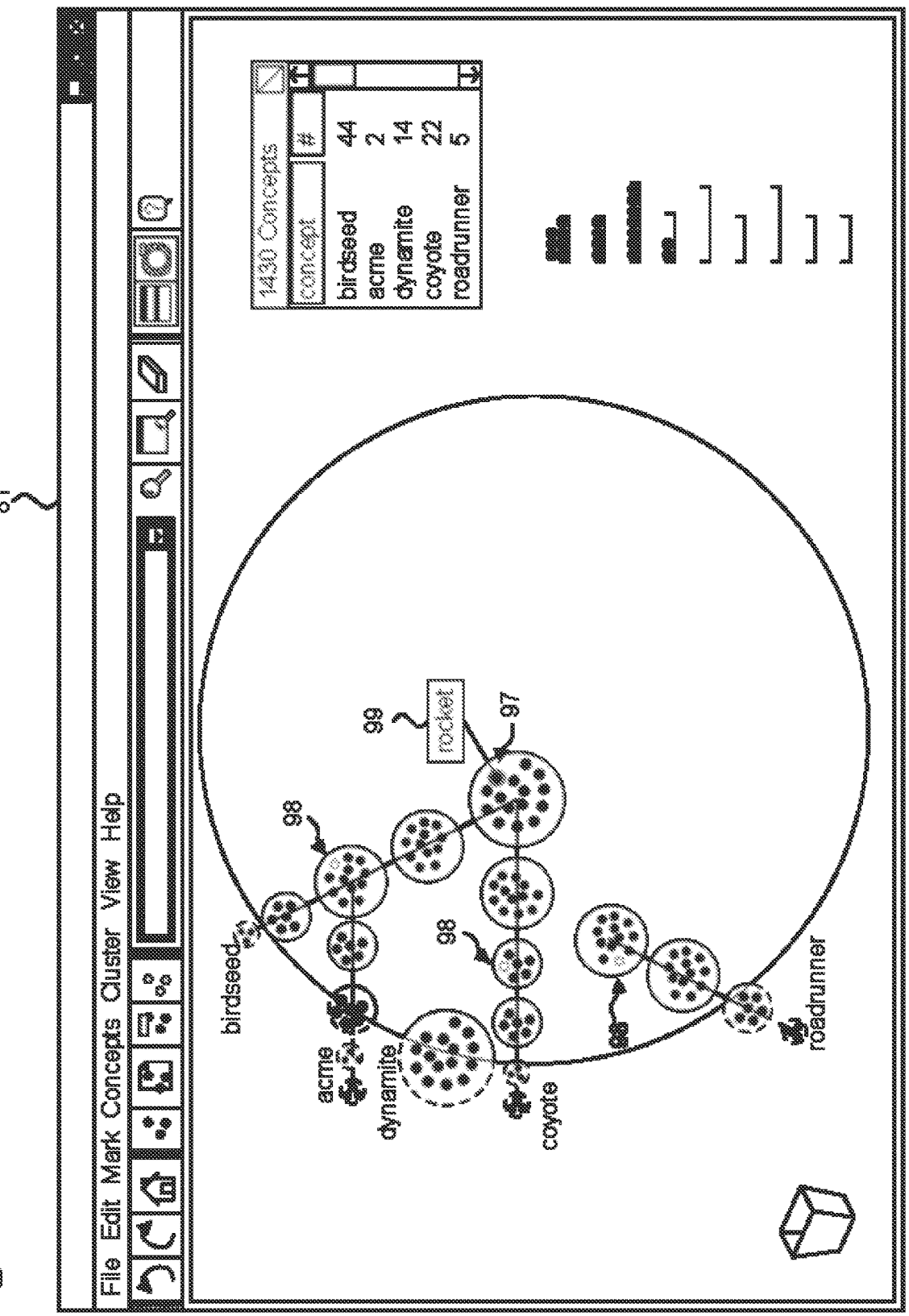

FIGS. 4A-C are screen display diagrams 80 showing, by way of example, a user interface 81 generated by the display generator 34 of FIG. 1. Referring first to FIG. 4A, the user interface 81 includes the controls and HUD. Cluster data is placed in a two-dimensional cluster view within the user interface 81. The controls and HUD enable a user to navigate, explore and search the cluster data 83 appearing within a compass 82, as further described below with reference to FIG. 5. The cluster data 84 appearing outside of the compass 82 is navigable until the compass is zoomed or panned over that cluster data 84. In a further embodiment, multiple and independent compasses 82 can be included in disjunctive, overlapping or concentric configurations. Other shapes and configurations of compasses are possible.

In one embodiment, the controls are provided by a combination of mouse button and keyboard shortcut assignments, which control the orientation, zoom, pan, and selection of placed clusters 83 within the compass 82, and toolbar buttons 87 provided on the user interface 81. By way of example, the mouse buttons enable the user to zoom and pan around and pin down the placed clusters 83. For instance, by holding the middle mouse button and dragging the mouse, the placed clusters 83 appearing within the compass 82 can be panned. Similarly, by rolling a wheel on the mouse, the placed clusters 83 appearing within the compass 82 can be zoomed inwards to or outwards from the location at which the mouse cursor points. Finally, by pressing a Home toolbar button or keyboard shortcut, the placed clusters 83 appearing within the compass 82 can be returned to an initial view centered on the display screen. Keyboard shortcuts can provide similar functionality as the mouse buttons.

Individual spine concepts 50 can be "pinned" in place on the circumference of the compass 82 by clicking the left mouse button on a cluster spine label 91. The spine label 91 appearing at the end of the concept pointer connecting the outermost cluster of placed clusters 83 associated with the pinned spine concept 50 are highlighted. Pinning fixes a spine label 91 to the compass 82, which causes the spine label 91 to remain fixed to the same place on the compass 82 independent of the location of the associated placed clusters 83 and adds weight to the associated cluster 83 during reclustering.

The toolbar buttons 87 enable a user to execute specific commands for the composition of the spine groups 49 displayed. By way of example, the toolbar buttons 87 provide the following functions:

(1) Select a previous document 14 in a cluster spiral;
(2) Select a next document 14 in a cluster spiral;
(3) Return to home view;
(4) Re-cluster documents 14;
(5) Select a document 14 and cluster the remaining documents 14 based on similarity in concepts to the document concepts 46 of the selected document 14;
(6) Select one or more cluster concepts 47 and cluster the documents 14 containing those selected concepts separately from the remaining documents 14;
(7) Re-cluster all highlighted documents 14 separately from the remaining documents 14;
(8) Quickly search for words or phrases that may not appear in the concept list 93, which is specified through a text dialogue box 89;
(9) Perform an advanced search based on, for instance, search terms, natural language or Boolean searching, specified files or file types, text only, including word variations, and metadata fields;
(10) Clear all currently selected concepts and documents highlighted;
(11) Display a document viewer;
(12) Disable the compass; and
(13) Provide help.

In addition, a set of pull down menus 88 provides further control over the placement and manipulation of clusters within the user interface 81. Other types of controls and functions are possible.

Visually, the compass 82 emphasizes visible placed clusters 83 and deemphasizes placed clusters 84 appearing outside of the compass 82. The view of the cluster spines appearing within the focus area of the compass 82 can be zoomed and panned and the compass 82 can also be resized and disabled. In one embodiment, the placed clusters 83 appearing within the compass 82 are displayed at full brightness, while the placed clusters 84 appearing outside the compass 82 are displayed at 30 percent of original brightness, although other levels of brightness or visual accent, including various combinations of color, line width and so forth, are possible. Spine labels 91 appear at the ends of concept pointers connecting the outermost cluster of select placed clusters 83 to preferably the closest point along the periphery of the compass 82. In one embodiment, the spine labels 91 are placed without overlap and circumferentially around the compass 82, as further described below with reference to FIG. 14. The spine labels 91 correspond to the cluster concepts 47 that most describe the spine groups 49 appearing within the compass 82. Additionally, the cluster concepts 47 for each of the spine labels 91 appear in a concepts list 93.

In one embodiment, a set of set-aside trays 85 are provided to graphically group those documents 86 that have been logically marked into sorting categories. In addition, a garbage can 90 is provided to remove cluster concepts 47 from consideration in the current set of placed spine groups 49. Removed cluster concepts 47 prevent those concepts from affecting future clustering, as may occur when a user considers a concept irrelevant to the placed clusters 84.

Referring next to FIG. 4B, in a further embodiment, a user interface 81 can include a navigation assistance panel 94, which provides a "bird's eye" view of the entire visualization, including the cluster data 83, 84. The navigation assistance panel 94 presents a perspective-altered rendition of the main screen display. The two-dimensional scene that is delineated by the boundaries of the screen display is represented within the navigation assistance panel 94 as an outlined frame 95 that is sized proportionate within the overall scene. The navigation assistance panel 94 can be resized, zoomed, and panned. In addition, within the navigation assistance panel 94, the compass 82 can be enabled, disabled, and resized and the lines connecting clusters in each spine group 94 can be displayed or omitted. Additionally, other indicia 96 not otherwise visible within the immediate screen display can be represented in the navigation assistance panel 94, such as miscellaneous clusters that are not part of or associated near any placed spine group 49 in the main screen display.

Referring finally to FIG. 4C, by default, a document 14 appears only once in a single cluster spiral. However, in a still further embodiment, a document can "appear" in multiple placed clusters 83. A document 97 is placed in the cluster 83 to which the document 97 is most closely related and is also placed in one or more other clusters 83 as pseudo-documents 98. When either the document 97 or a pseudo-document 98 is selected, the document 97 is highlighted and each pseudo-document 98 is visually depicted as a "shortcut" or ghost document, such as with de-emphasis or dotted lines. Additionally, a text label 99 can be displayed with the document 97 to identify the highest scoring concept.

User Interface

Figure 5:
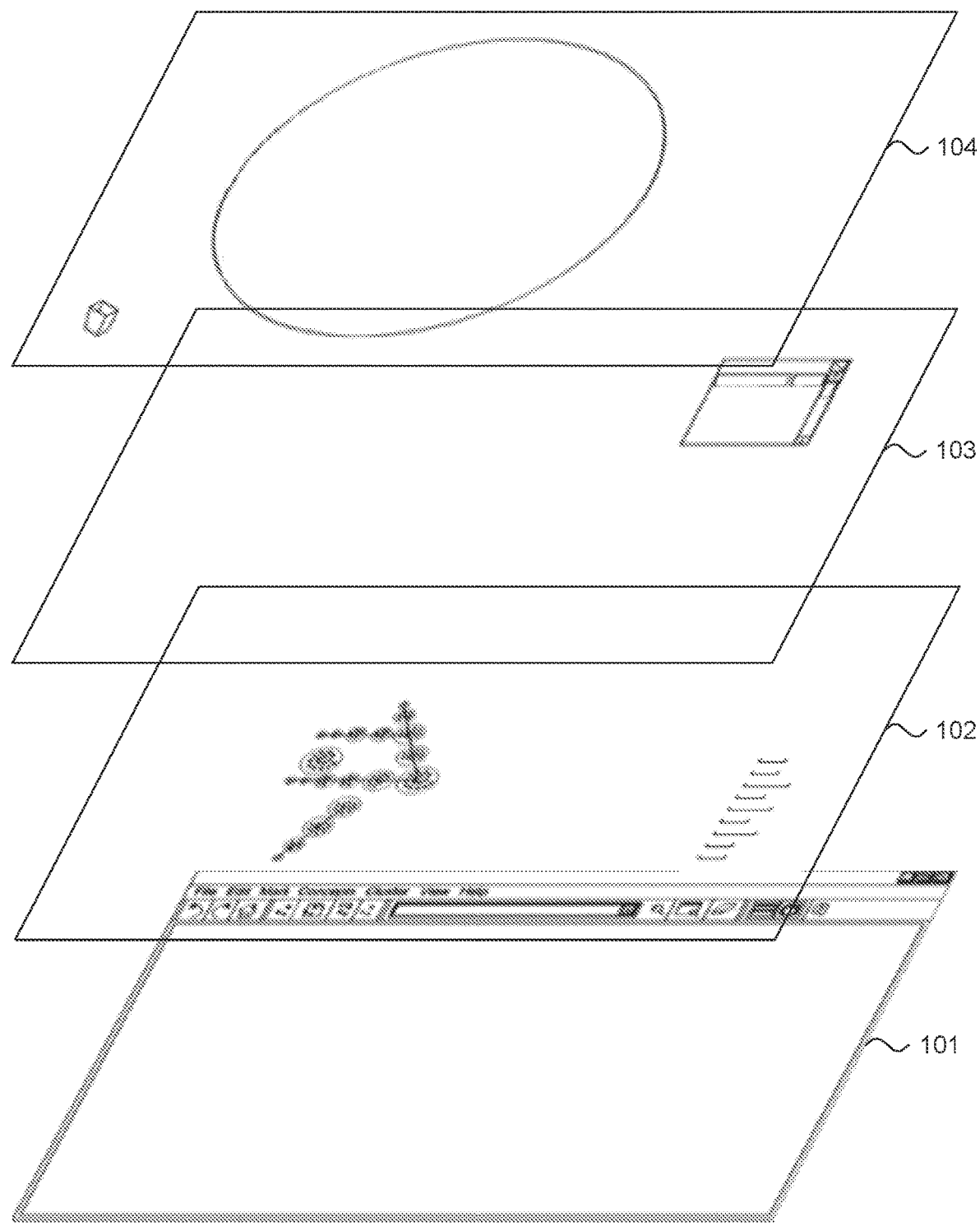
FIG. 5 is an exploded screen display diagram showing the user interface of FIGS. 4A-C.

FIG. 5 is an exploded screen display diagram 100 showing the user interface 81 of FIGS. 4A-C. The user interface 81 includes controls 101, concepts list 103 and HUD 104. Clusters 102 are presented to the user for viewing and manipulation via the controls 101, concepts list 103 and HUD 104. The controls 101 enable a user to navigate, explore and search the cluster space through the mouse buttons, keyboard and toolbar buttons 87. The concepts list 103 identifies a total number of concepts and lists each concept and the number of occurrences. Concepts can be selected from the concepts list 103. Lastly, the HUD 104 creates a visual illusion that draws the users' attention to the compass 82 without actually effecting the composition of the clusters 102.

User Interface Controls Examples

FIGS. 6A-D are data representation diagrams 120, 130, 140, 150 showing, by way of examples, display zooming, panning and pinning using the user interface 81 of FIGS. 4A-C. Using the controls, a user can zoom and pan within the HUD and can pin spine concepts 50, as denoted by the spine labels for placed clusters 83. Zooming increases or decreases the amount of the detail of the placed clusters 83 within the HUD, while panning shifts the relative locations of the placed clusters 83 within the HUD. Other types of user controls are possible.

Figure 6A:
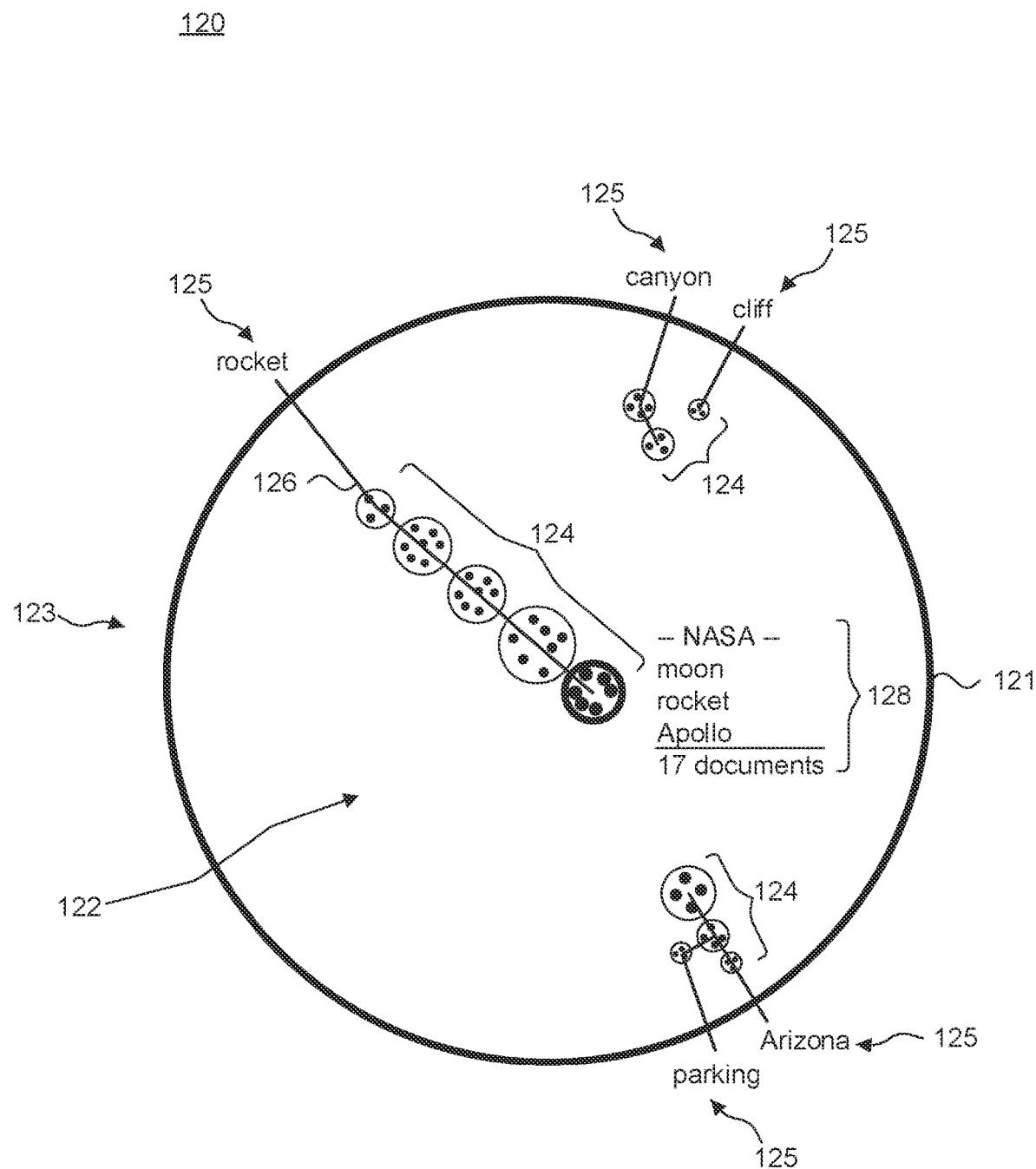
FIGS. 6A-D are data representation diagrams showing, by way of examples, display zooming, panning and pinning using the user interface of FIGS. 4A-C.

Referring first to FIG. 6A, a compass 121 frames a set of cluster spines 124. The compass 121 logically separates the cluster spines 124 into a "focused" area 122, that is, those cluster spines 124 appearing inside of the compass 121, and an "unfocused" area 123, that is, the remaining cluster spines 124 appearing outside of the compass 121.

In one embodiment, the unfocused area 123 appears under a visual "velum" created by decreasing the brightness of the placed cluster spines 124 outside the compass 121 by 30 percent, although other levels of brightness or visual accent, including various combinations of color, line width and so forth, are possible. The placed cluster spines 124 inside of the focused area 122 are identified by spine labels 125, which are placed into logical "slots" at the end of concept pointers 126 that associate each spine label 125 with the corresponding placed cluster spine 124. The spine labels 125 show the common concept 46 that connects the clusters 83 appearing in the associated placed cluster spine 124. Each concept pointer 126 connects the outermost cluster 45 of the associated placed cluster spine 124 to the periphery of the compass 121 centered in the logical slot for the spine label 125. Concept pointers 126 are highlighted in the HUD when a concept 46 within the placed cluster spine 124 is selected or a pointer, such as a mouse cursor, is held over the concept 46. Each cluster 83 also has a cluster label 128 that appears when the pointer is used to select a particular cluster 83 in the HUD. The cluster label 128 shows the top concepts 46 that brought the documents 14 together as the cluster 83, plus the total number of documents 14 for that cluster 83.

In one embodiment, spine labels 125 are placed to minimize the length of the concept pointers 126. Each spine label 125 is optimally situated to avoid overlap with other spine labels 125 and crossing of other concept pointers 126, as further described below with reference to FIG. 14. In addition, spine labels 125 are provided for only up to a predefined number of placed cluster spines 124 to prevent the compass 121 from becoming too visually cluttered and to allow the user to retrieve extra data, if desired. The user also can change the number of spine labels 125 shown in the compass 121.

Figure 6B:
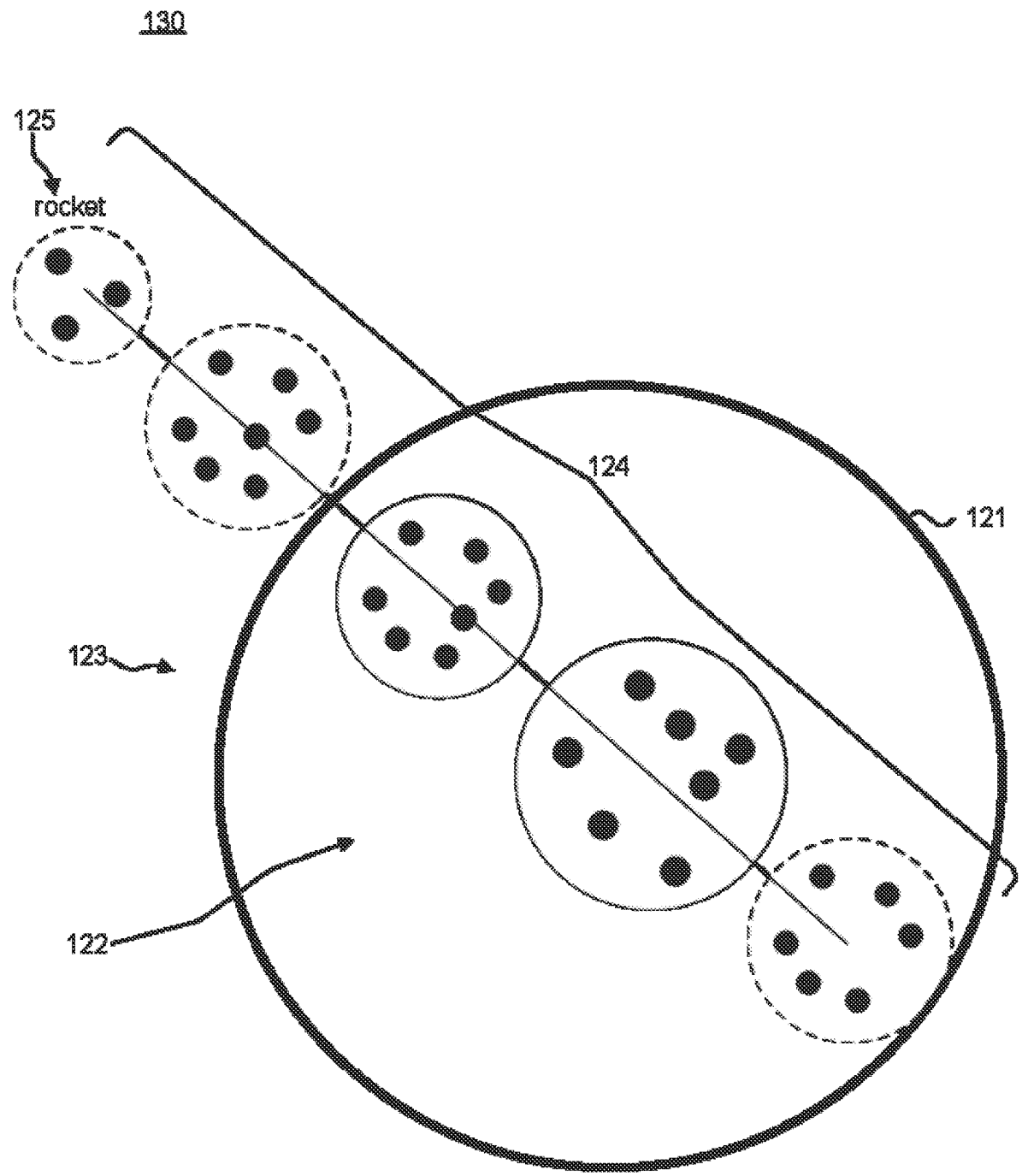

Referring next to FIG. 6B, the placed cluster spines 124 as originally framed by the compass 121 have been zoomed inwards. When zoomed inwards, the placed cluster spines 124 appearing within the compass 121 nearest to the pointer appear larger. In addition, those placed cluster spines 124 originally appearing within the focused area 122 that are closer to the inside edge of the compass 121 are shifted into the unfocused area 123. Conversely, when zoomed outwards, the placed cluster spines 124 appearing within the compass 121 nearest to the pointer appear smaller. Similarly, those placed cluster spines 124 originally appearing within the unfocused area 123 that are closer to the outside edge of the compass 121 are shifted into the focused area 122.

In one embodiment, the compass 121 zooms towards or away from the location of the pointer, rather than the middle of the compass 121. Additionally, the speed at which the placed cluster spines 124 within the focused area 122 changes can be varied. For instance, variable zooming can move the compass 121 at a faster pace proportionate to the distance to the placed cluster spines 124 being viewed. Thus, a close-up view of the placed cluster spines 124 zooms more slowly than a far away view. Finally, the spine labels 125 become more specific with respect to the placed cluster spines 124 appearing within the compass 121 as the zooming changes. High level details are displayed through the spine labels 125 when the compass 121 is zoomed outwards and low level details are displayed through the spine labels 125 when the compass 121 is zoomed inwards. Other zooming controls and orientations are possible.

Figure 6C:
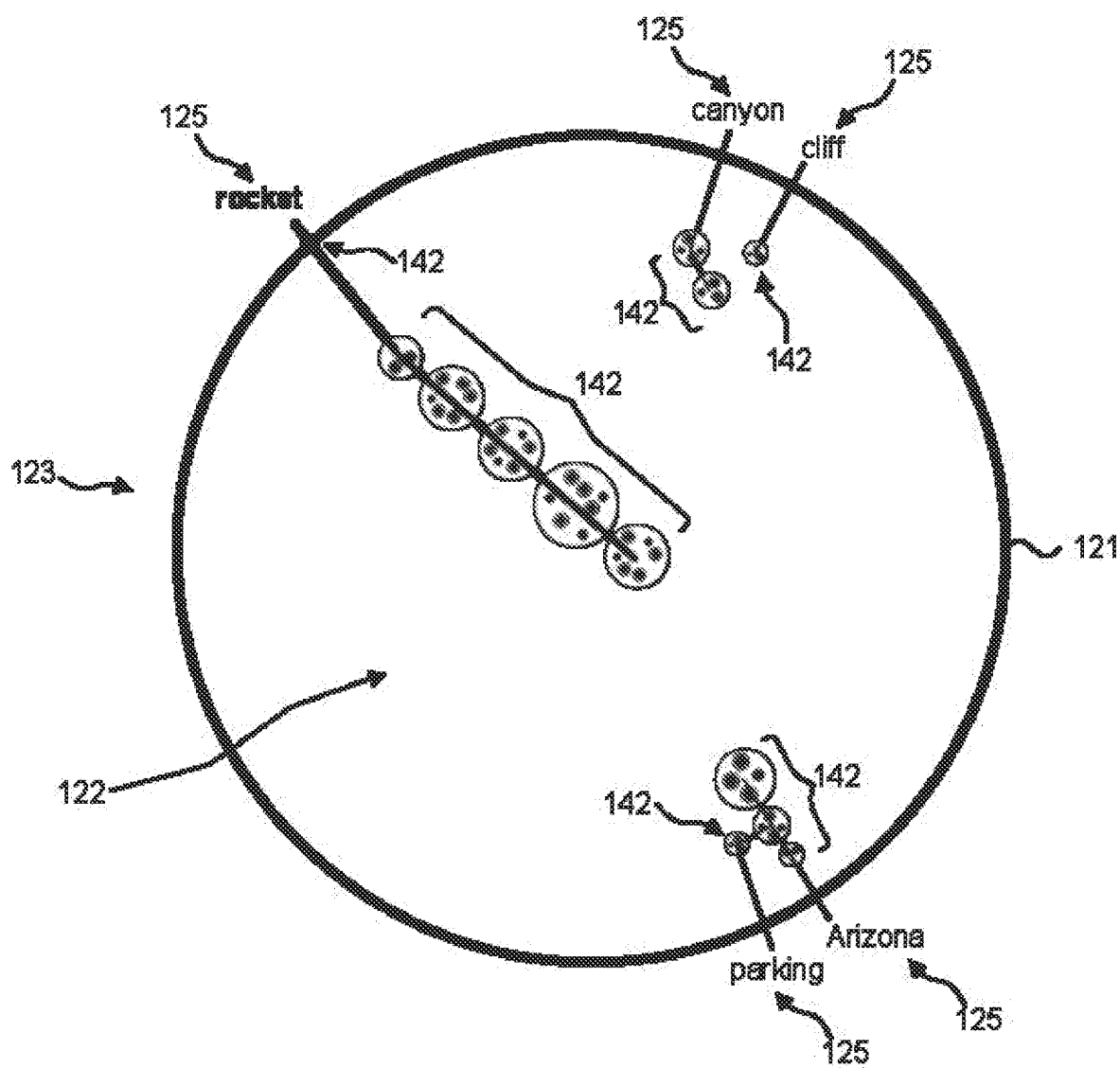

Referring next to FIG. 6C, the placed cluster spines 124 as originally framed by the compass 121 have been zoomed back outwards and a spine label 125 has been pinned to fixed location on the compass 121. Ordinarily, during zooming and panning, the spine labels 125 associated with the placed cluster spines 124 that remain within the compass 121 are redrawn to optimally situate each spine label 125 to avoid overlap with other spine labels 125 and the crossing of other concept pointers 126 independent of the zoom level and panning direction. However, one or more spine labels 125 can be pinned by fixing the location 141 of the spine label 125 along the compass 121 using the pointer. Subsequently, each pinned spine label 125 remains fixed in-place, while the associated placed cluster spine 124 is reoriented within the compass 121 by the zooming or panning. When pinned, each cluster 142 corresponding to the pinned spine label 125 is highlighted. Finally, highlighted spine labels 125 are dimmed during panning or zooming.

Figure 6D:
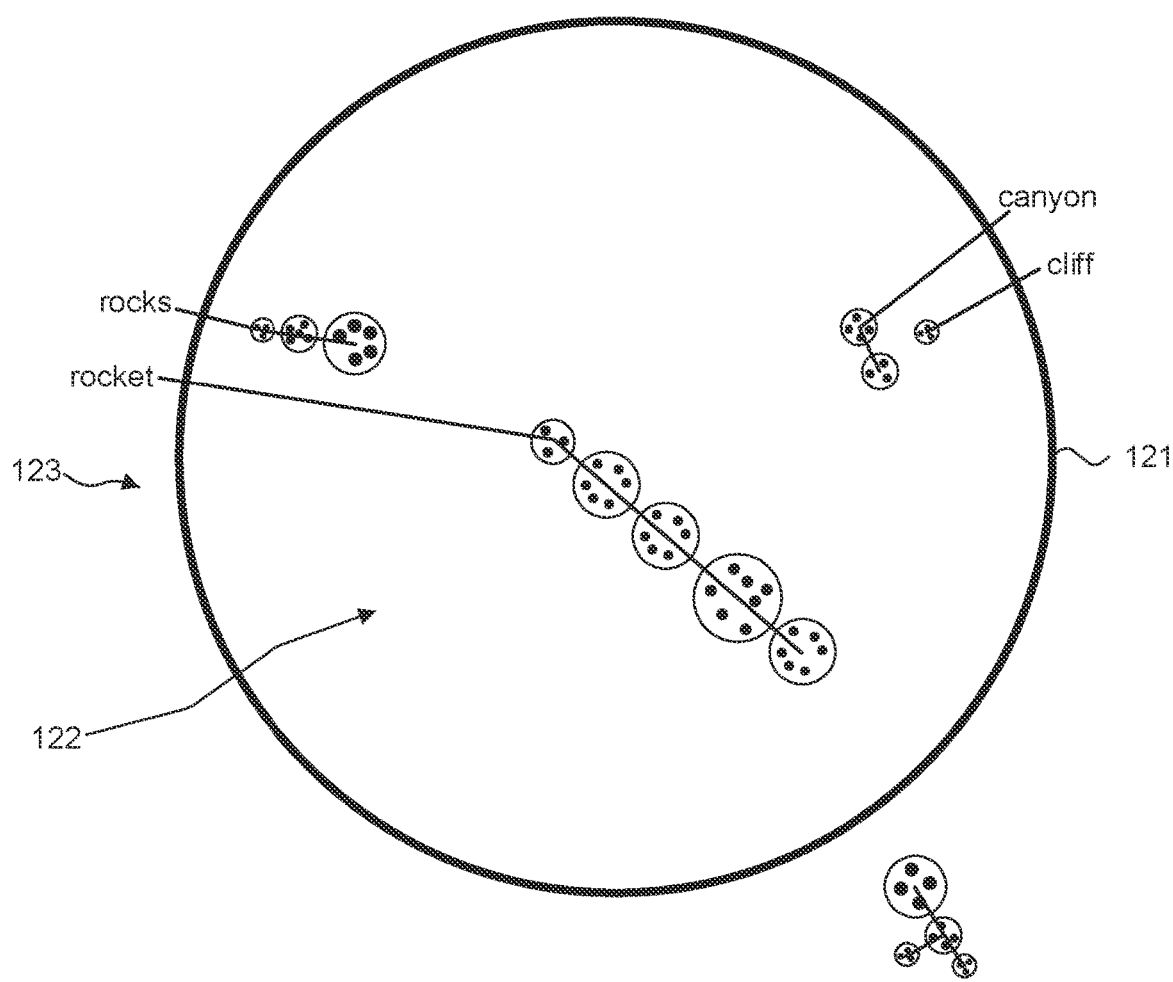

Referring lastly to FIG. 6D, the compass 121 has been panned down and to the right. When panned, the placed cluster spines 124 appearing within the compass 121 shift in the direction of the panning motion. Those placed cluster spines 124 originally appearing within the focused area 122 that are closer to the edge of the compass 121 away from the panning motion are shifted into the unfocused area 123 while those placed cluster spines 124 originally appearing within the unfocused area 123 that are closer to the outside edge of the compass 121 towards the panning motion are shifted into the focused area 122. In one embodiment, the compass 121 pans in the same direction as the pointer is moved. Other panning orientations are possible.

Example Multiple Compasses

Figure 7:
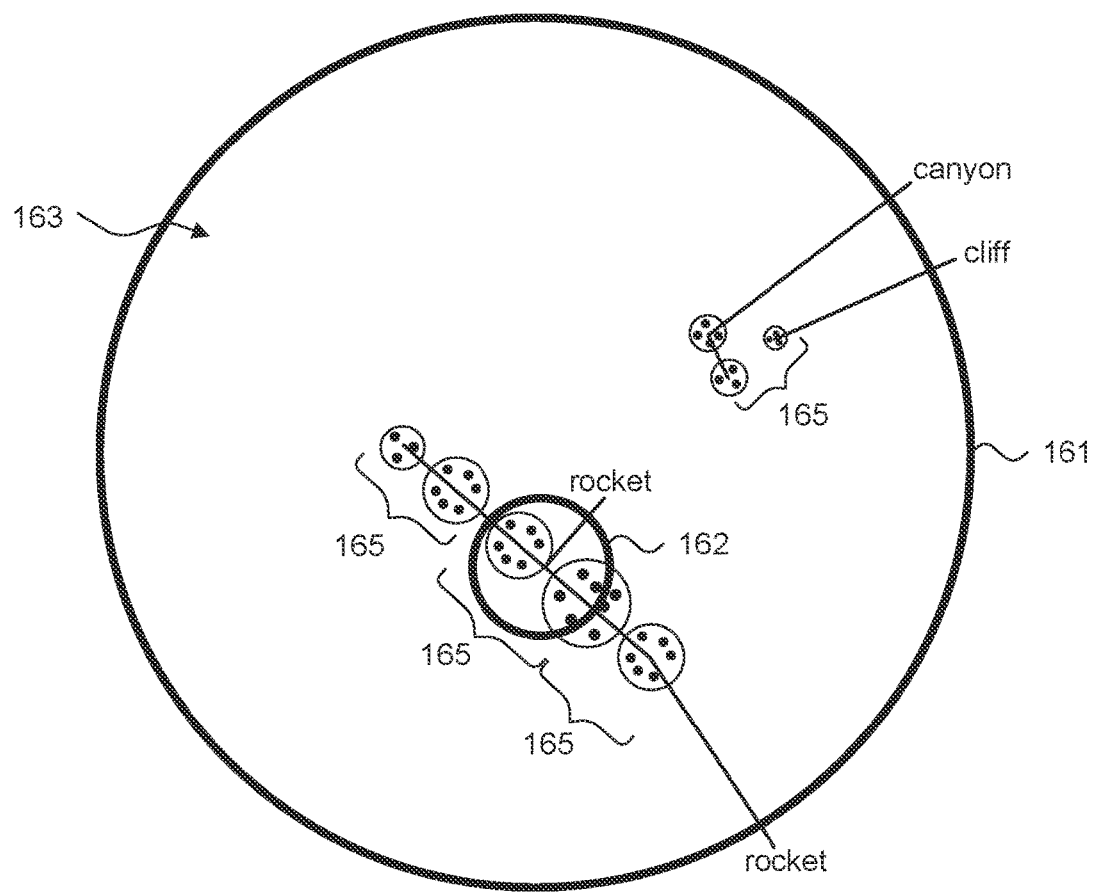
FIG. 7 is a data representation diagram showing, by way of example, multiple compasses generated using the user interface of FIGS. 4A-C.

FIG. 7 is a data representation diagram 160 showing, by way of example, multiple compasses 161, 162 generated using the user interface 81 of FIGS. 4A-C. Each compass 161, 162 operates independently from any other compass and multiple compasses can 161, 162 be placed in disjunctive, overlapping or concentric configurations to allow the user to emphasize different aspects of the placed cluster spines 124 without panning or zooming. Spine labels for placed cluster spines are generated based on the respective focus of each compass 161, 162. Thus, the placed cluster spines 166 appearing within the focused area of an inner compass 162 situated concentric to an outer compass 161 result in one set of spine labels, while those placed cluster spines 165 appearing within the focused area of the outer compass 161 result in another set of spine labels, which may be different that the inner compass spine labels set. In addition, each compass 161, 162 can be independently resized. Other controls, arrangements and orientations of compasses are possible.

Example Single and Multiple Compasses

Figure 8A:
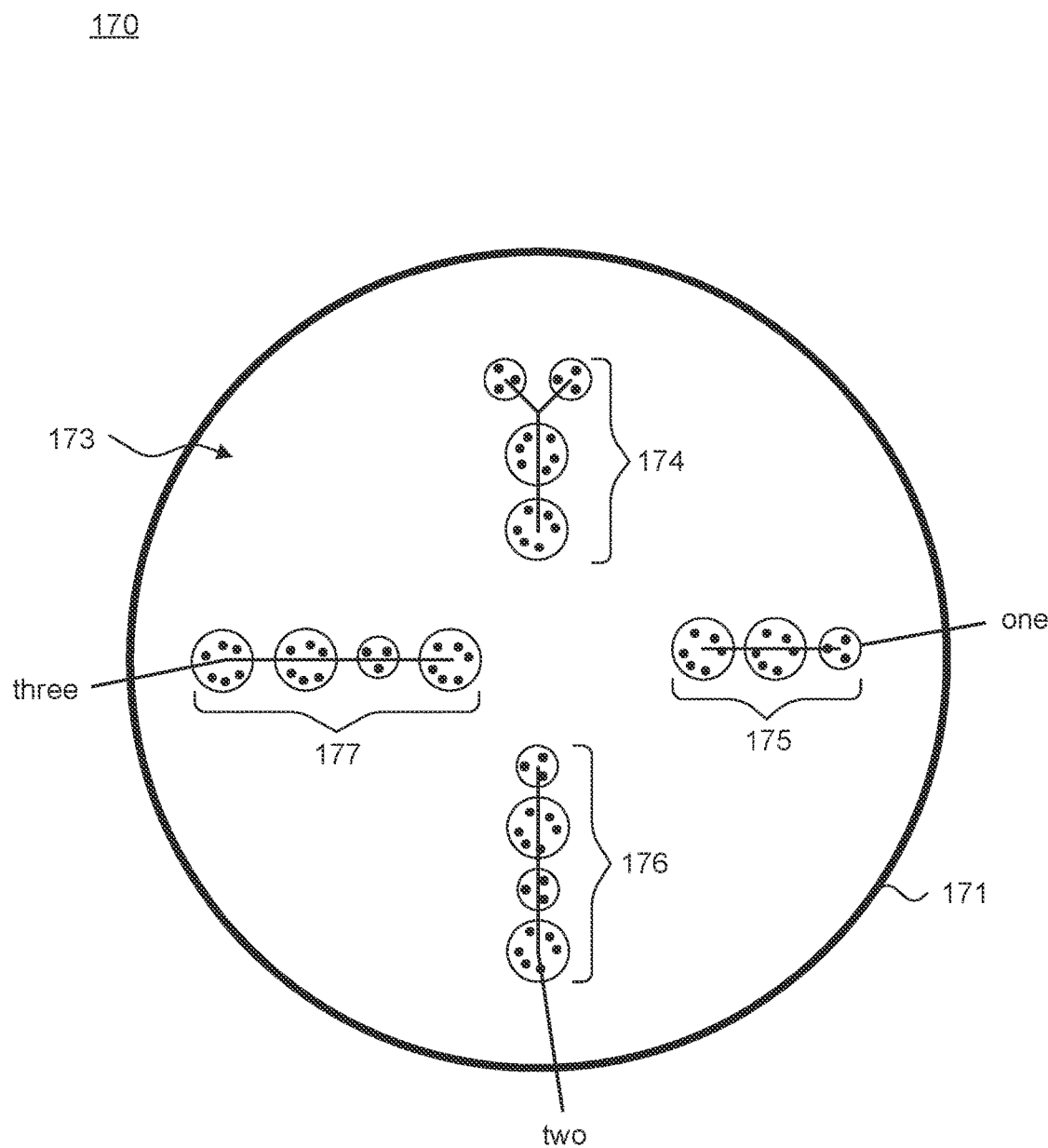
FIGS. 8A-C are data representation diagrams showing, by way of example, single and multiple compasses generated using the user interface of FIGS. 4A-C.
Figure 8B:
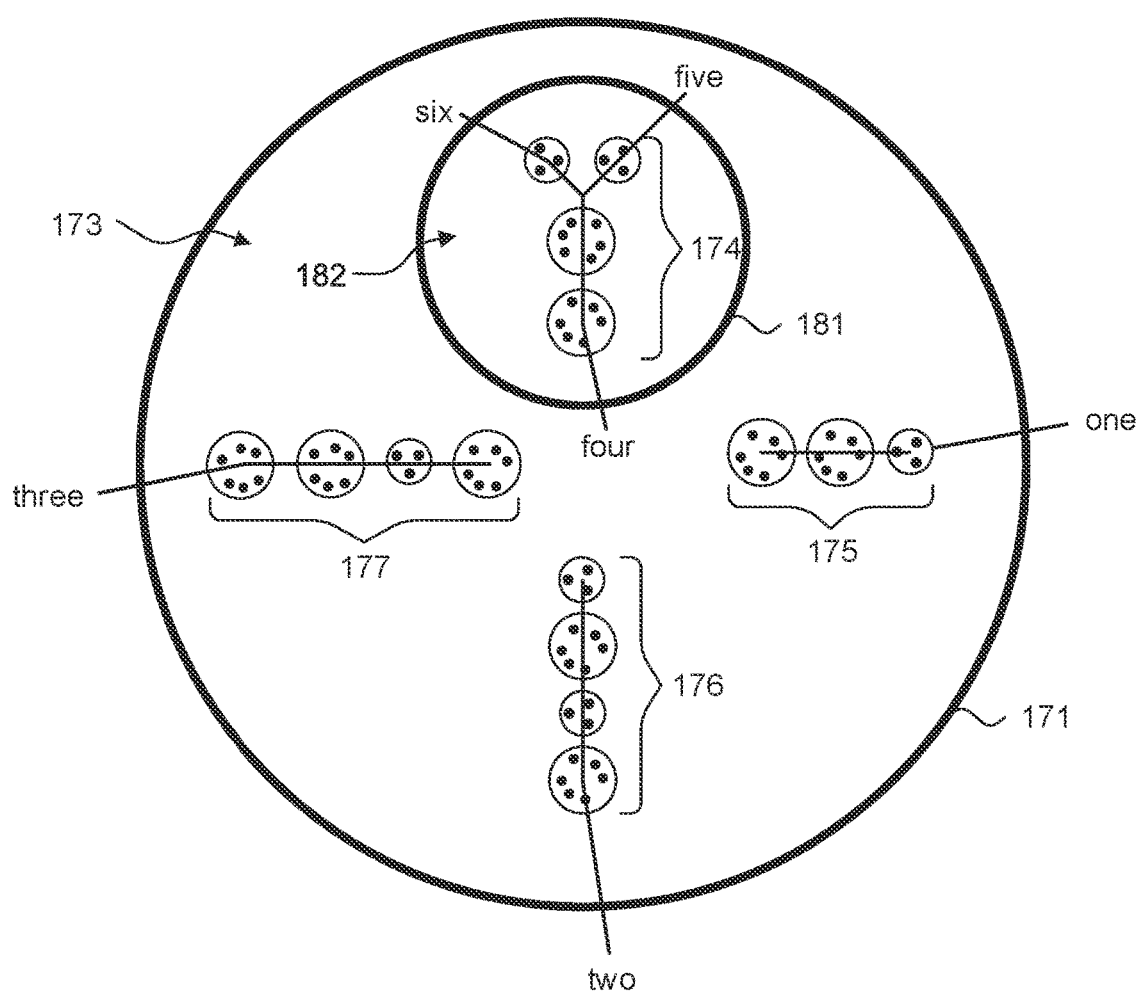
Figure 8C:
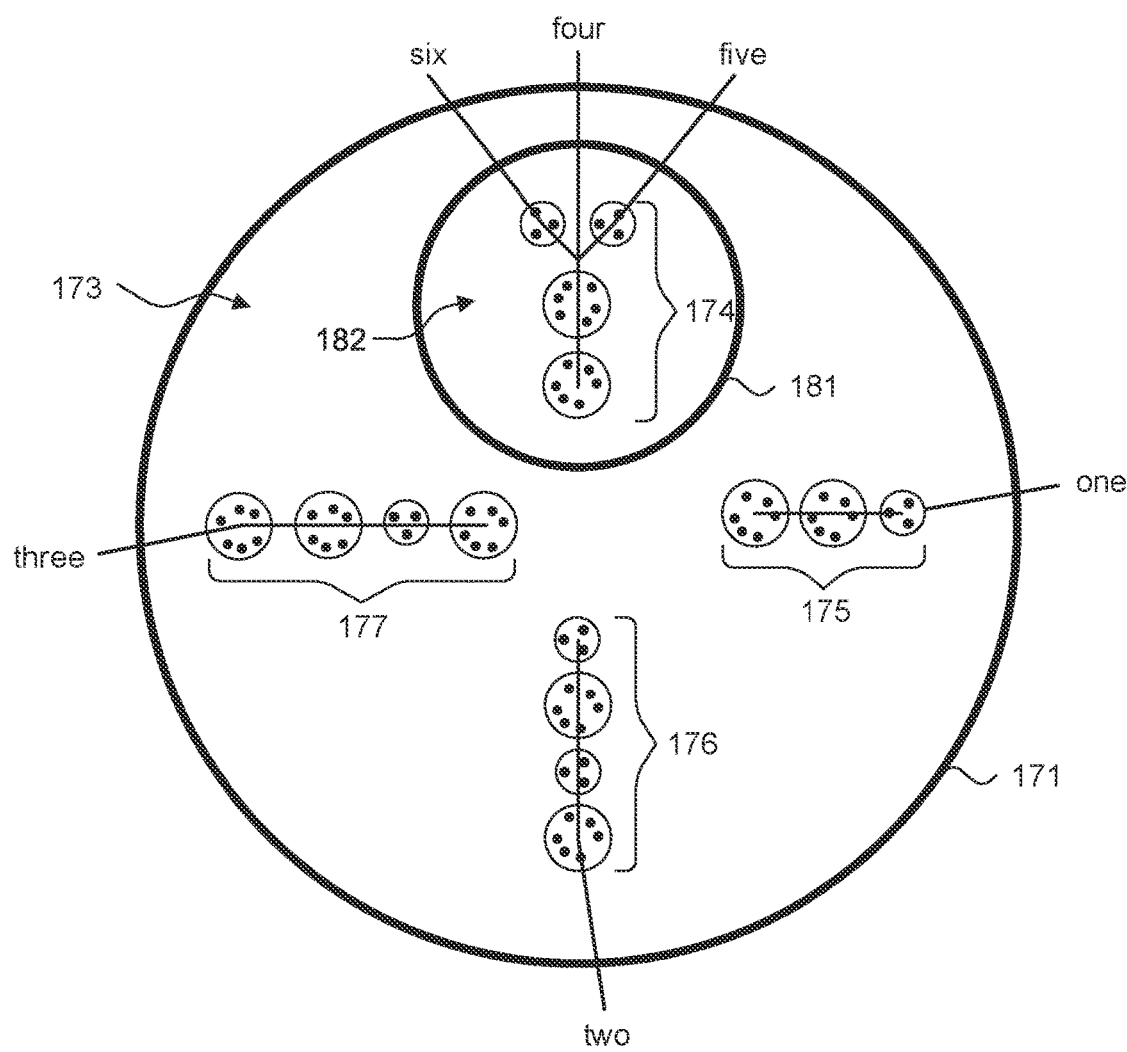

FIGS. 8A-C are data representation diagrams 170, 180, 190 showing, by way of example, single 171 and multiple compasses 171, 181 generated using the user interface of FIGS. 4A-C. Multiple compasses can be used to show concepts through spine labels concerning those cluster spines appearing within their focus, whereas spine labels for those same concepts may not be otherwise generated. Referring first to FIG. 8A, an outer compass 171 frames four sets of cluster spines 174, 175, 176, 177. Spine labels for only three of the placed cluster spines 175, 176, 177 in the "focused" area 173 are generated and placed along the outer circumference of the outer compass 171. Referring next to FIG. 8B, an inner compass 181 frames the set of cluster spines 174. Spine labels for the placed cluster spines 174 in the "focused" area 182 are generated and placed along the outer circumference of the inner compass 181, even though these spine same labels were not generated and placed along the outer circumference of the outer compass 171. Referring lastly to FIG. 8C, in a further embodiment, spine labels for the placed cluster spines in the "focused" area 173 are generated and placed along the outer circumference of the original outer compass 171. The additional spine labels have no effect on the focus of the outer compass 171. Other controls, arrangements and orientations of compasses are possible.

Example Cluster Spine Group

FIG. 9 is a data representation diagram 210 showing, by way of example, a cluster spine group 49. One or more cluster spine groups 49 are presented. In one embodiment, the cluster spine groups 49 are placed in a circular arrangement centered initially in the compass 82, as further described below with reference to FIG. 10. A set of individual best fit spines 211, 213, 216, 219 are created by assigning clusters 45 sharing a common best fit theme. The best fit spines are ordered based on spine length and the longest best fit spine 121 is selected as an initial unique seed spine. Each of the unplaced remaining best fit spines 213, 216, 219 are grafted onto the placed best fit spine 211 by first building a candidate anchor cluster list. If possible, each remaining best fit spine 216, 219 is placed at an anchor cluster 218, 221 on the best fit spine that is the most similar to the unplaced best fit spine. The best fit spines 211, 216, 219 are placed along a vector 212, 217, 219 with a connecting line drawn in the visualization 54 to indicate relatedness. Otherwise, each remaining best fit spine 213 is placed at a weak anchor 215 with a connecting line 214 drawn in the visualization 54 to indicate relatedness. However, the connecting line 214 does not connect to the weak anchor 215. Relatedness is indicated by proximity only.

Next, each of the unplaced remaining singleton clusters 222 are loosely grafted onto a placed best fit spine 211, 216, 219 by first building a candidate anchor cluster list. Each of the remaining singleton clusters 222 are placed proximal to an anchor cluster that is most similar to the singleton cluster. The singleton clusters 222 are placed along a vector 212, 217, 219, but no connecting line is drawn in the visualization 54. Relatedness is indicated by proximity only.

Cluster Spine Group Placement Example

Figure 10:
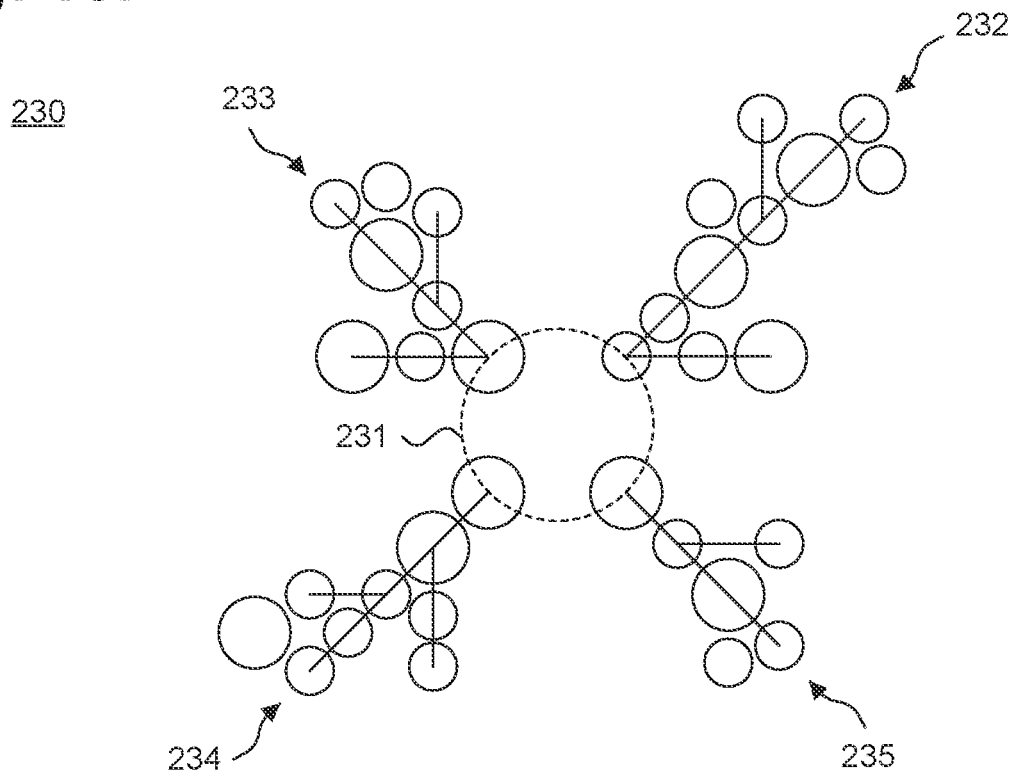
FIG. 10 is a data representation diagram showing, by way of examples, cluster spine group placements.

FIG. 10 is a data representation diagram 230 showing, by way of examples, cluster spine group placements. A set of seed cluster spine groups 232-235 are shown evenly-spaced circumferentially to an innermost circle 231. No clusters 80 assigned to each seed cluster spine group frame a sector within which the corresponding seed cluster spine group is placed.

Cluster Spine Group Overlap Removal Example

Figure 11:
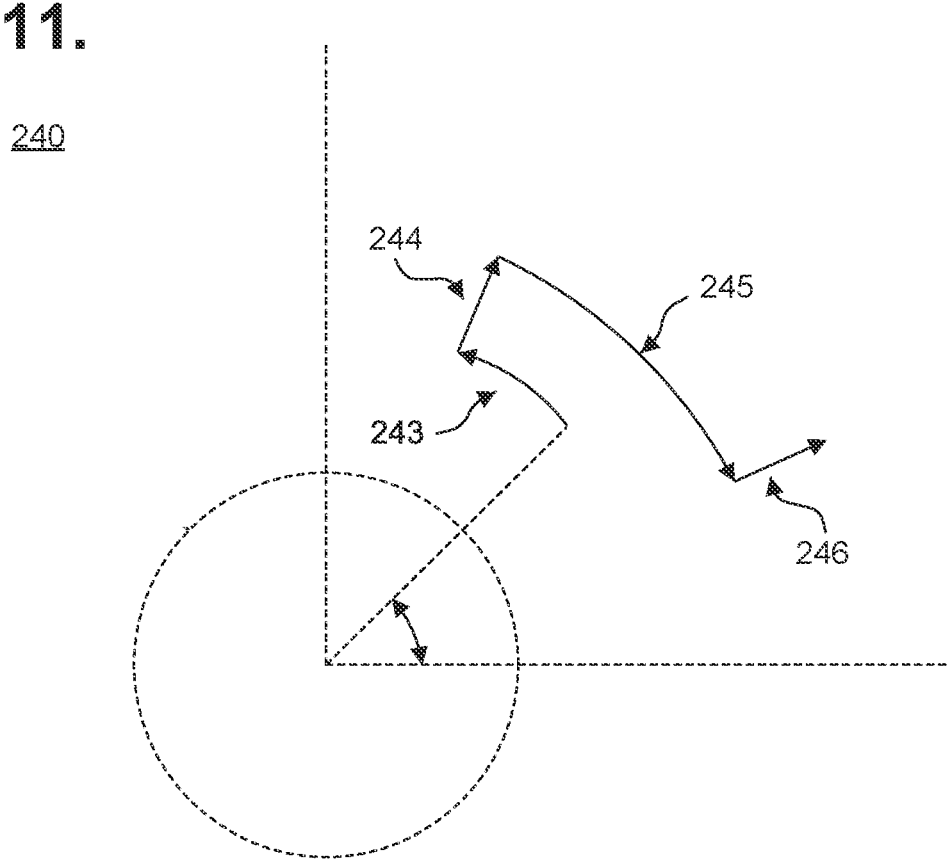
FIG. 11 is a data representation diagram showing, by way of example, cluster spine group overlap removal.

FIG. 11 is a data representation diagram 240 showing, by way of example, cluster spine group overlap removal. An overlapping cluster spine group is first rotated in an anticlockwise direction 243 up to a maximum angle and, if still overlapping, translated in an outwards direction 244. Rotation 245 and outward translation 246 are repeated until the overlap is resolved. The rotation can be in any direction and amount of outward translation any distance.

Method Overview

Figure 12:
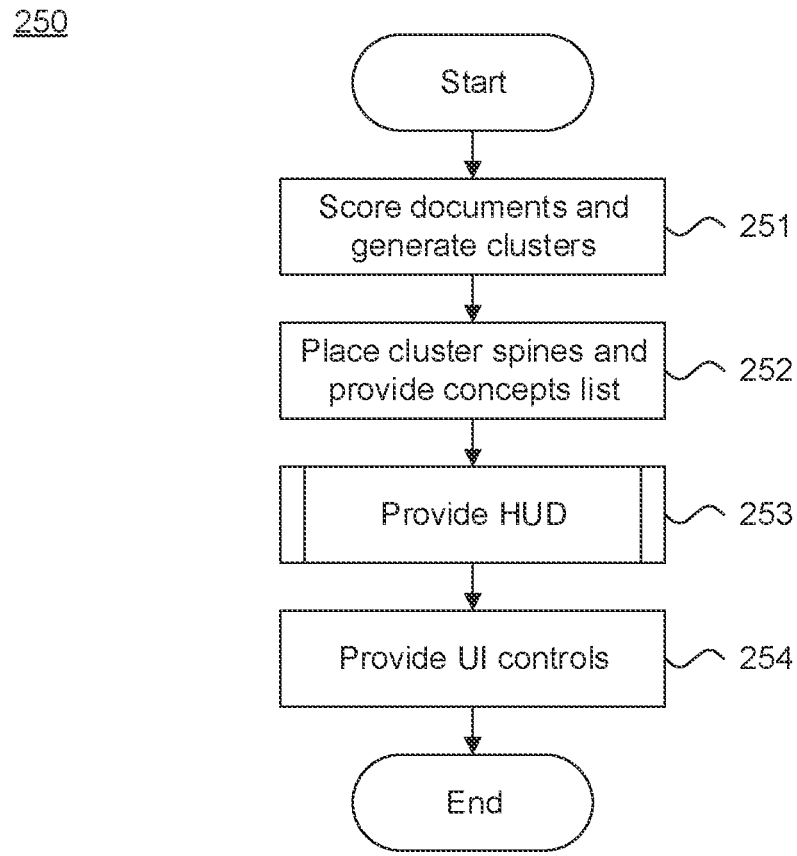
FIG. 12 is a flow diagram showing a method for providing a user interface for a dense three-dimensional scene, in accordance with the invention.

FIG. 12 is a flow diagram showing a method 250 for providing a user interface 81 for a dense three-dimensional scene, in accordance with the invention. The method 250 is described as a sequence of process operations or steps, which can be executed, for instance, by a displayed generator 34 (shown in FIG. 1).

As an initial step, documents 14 are scored and clusters 45 are generated (block 251), such as described in commonly-assigned U.S. Pat. No. 7,610,313, issued Oct. 27, 2009, the disclosure of which is incorporated by reference. Next, clusters spines are placed as cluster groups 49 (block 252), such as described in commonly-assigned U.S. Pat. No. 7,191,175, issued Mar. 13, 2007, and U.S. Pat. No. 7,440,622, issued Oct. 21, 2008, the disclosures of which are incorporated by reference, and the concepts list 103 is provided. The HUD 104 is provided (block 253) to provide a focused view of the clusters 102, as further described below with reference to FIG. 13. Finally, controls are provided through the user interface 81 for navigating, exploring and searching the cluster space (block 254). The method then terminates.

HUD Generation

Figure 13:
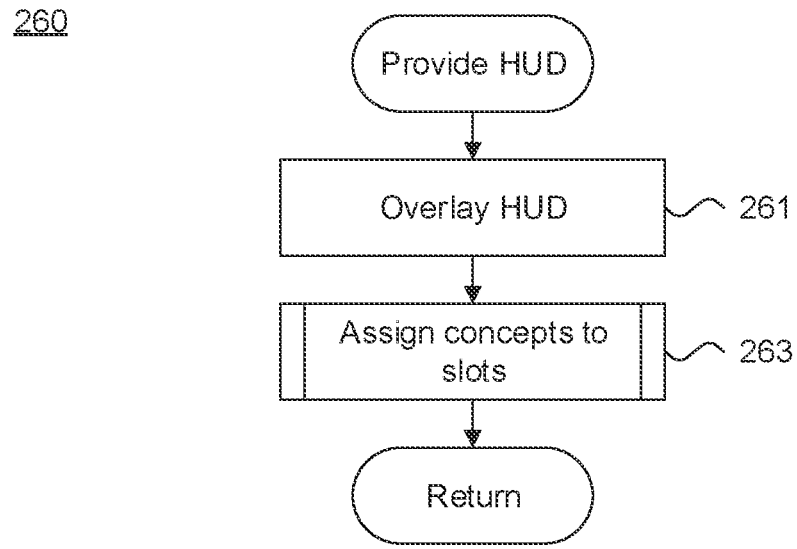
FIG. 13 is a flow diagram showing the routine for providing a HUD for use in the method of FIG. 12.

FIG. 13 is a flow diagram showing the routine 260 for providing a HUD for use in the method 250 of FIG. 12. One purpose of this routine is to generate the visual overlay, including the compass 82, that defines the HUD.

Initially, the compass 82 is generated to overlay the placed clusters layer 102 (block 261). In a further embodiment, the compass 82 can be disabled. Next, cluster concepts 47 are assigned into the slots 51 (block 263), as further described below with reference to FIG. 14. Following cluster concept 47 assignment, the routine returns.

Concept Assignment to Slots

Figure 14:
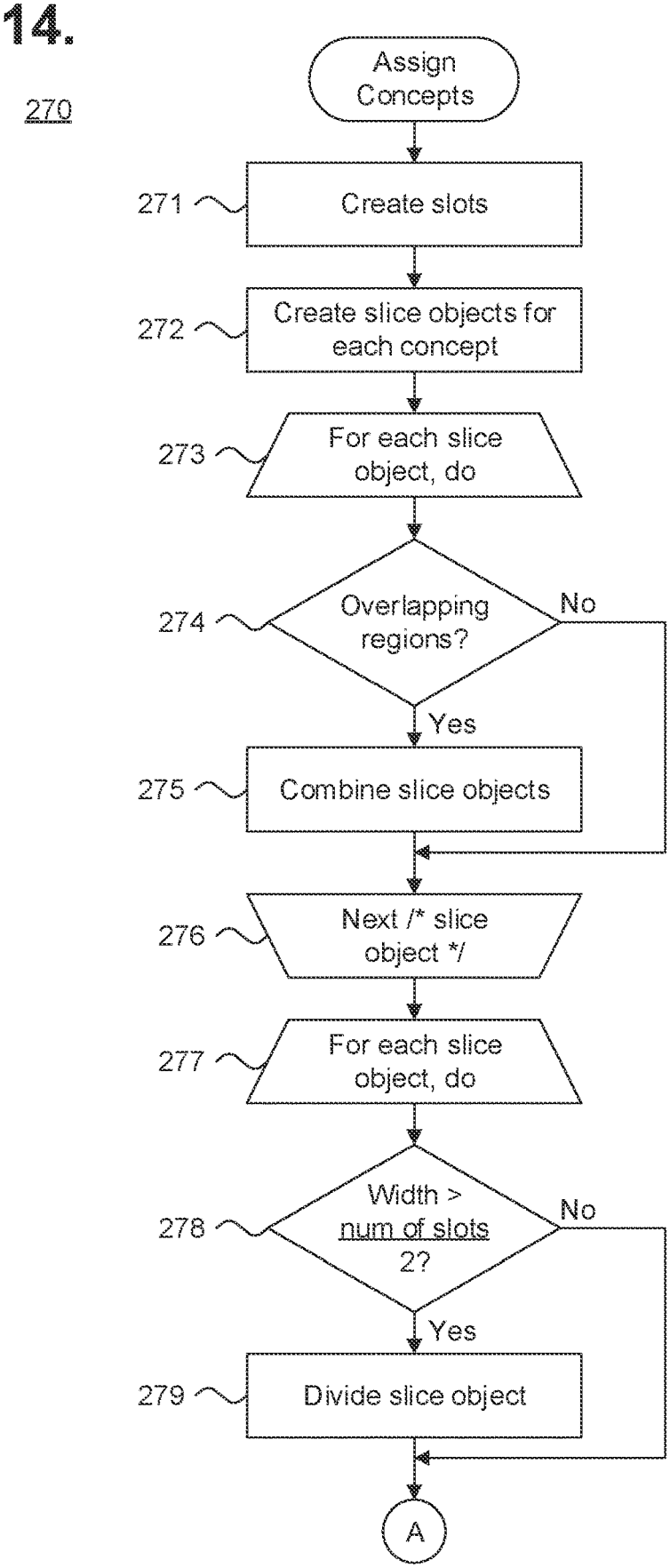
FIG. 14 is a flow diagram showing the routine for assigning clusters to slots for use in the routine of FIG. 13.
Figure 14:
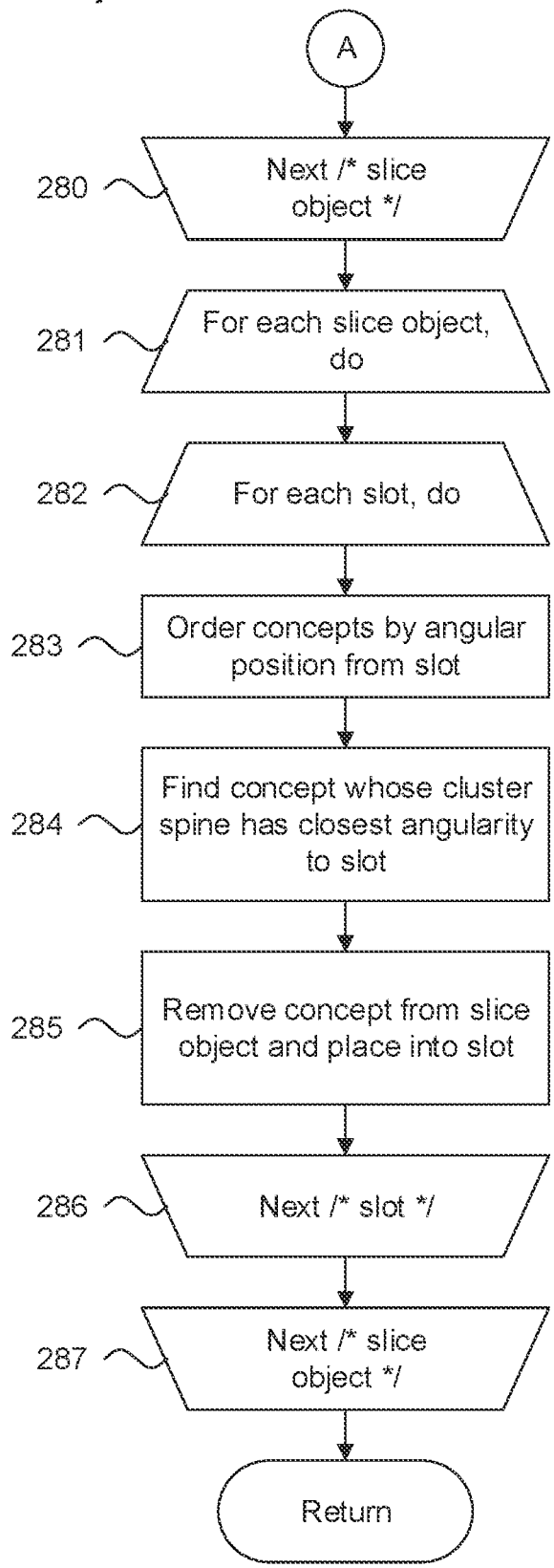

FIG. 14 is a flow diagram showing the routine 270 for assigning concepts 47 to slots 51 for use in the routine 260 of FIG. 13. One purpose of this routine is to choose the locations of the spine labels 91 based on the placed clusters 83 appearing within the compass 82 and available slots 51 to avoid overlap and crossed concept pointers.

Initially, a set of slots 51 is created (block 271). The slots 51 are determined to circumferentially defined around the compass 82 to avoid crossing of navigation concept pointers and overlap between individual spine labels 91 when projected into two dimensions. In one embodiment, the slots 51 are determined based on the three-dimensional Cartesian coordinates 65 (shown in FIG. 3) of the outermost cluster in select spine groups 49 and the perspective of the user in viewing the three-dimensional space 62. As the size of the compass 82 changes, the number and position of the slots 51 change. If there are fewer slots available to display the cluster concepts 47 selected by the user, only the number of cluster concepts 47 that will fit in the slots 51 available will be displayed.

Next, a set of slice objects is created for each cluster concept 47 that occurs in a placed cluster 83 appearing within the compass 82 (block 272). Each slice object defines an angular region of the compass 82 and holds the cluster concepts 47 that will appear within that region, the center slot 51 of that region, and the width of the slice object, specified in number of slots 51. In addition, in one embodiment, each slice object is interactive and, when associated with a spine label 91, can be selected with a mouse cursor to cause each of the cluster concepts 47 in the display to be selected and highlighted. Next, framing slice objects are identified by iteratively processing each of the slice objects (blocks 273-276), as follows. For each slice object, if the slice object defines a region that frames another slice object (block 274), the slice objects are combined (block 275) by changing the center slot 51, increasing the width of the slice object, and combining the cluster concepts 47 into a single slice object. Next, those slice objects having a width of more than half of the number of slots 51 are divided by iteratively processing each of the slice objects (block 277-280), as follows. For each slice object, if the width of the slice object exceeds the number of slots divided by two (block 278), the slice object is divided (block 279) to eliminate unwanted crossings of lines that connect spine labels 91 to associated placed clusters 83. Lastly, the cluster concepts 47 are assigned to slots 51 by a set of nested processing loops for each of the slice objects (blocks 281-287) and slots 51 (blocks 282-286), as follows. For each slot 51 appearing in each slice object, the cluster concepts 47 are ordered by angular position from the slot 51 (block 283), as further described below with reference to FIG. 13. The cluster concept 47 whose corresponding cluster spine has the closest angularity to the slot 51 is selected (block 284). The cluster concept 47 is removed from the slice object and placed into the slot 51 (block 285), which will then be displayed within the HUD layer 103 as a spine label 91. Upon the completion of cluster concept 47 assignments, the routine returns.

Cluster Assignment Example

Figure 15:
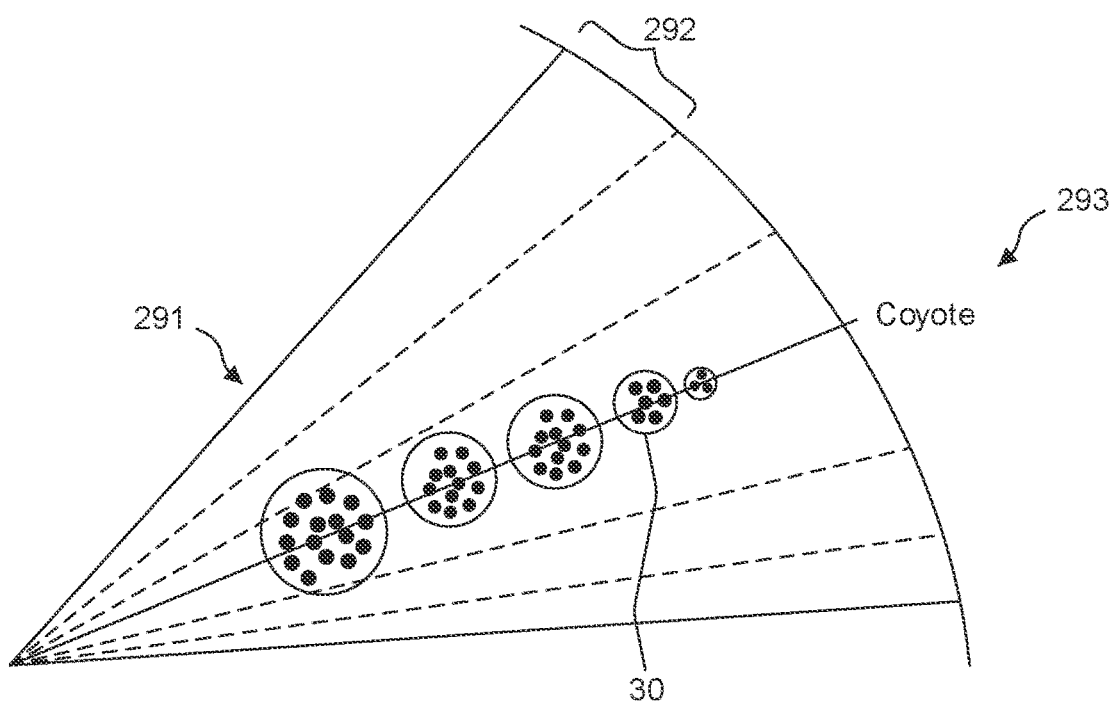
FIG. 15 is a data representation diagram showing, by way of example, a cluster assignment to a slot within a slice object.

FIG. 15 is a data representation diagram 290 showing, by way of example, a cluster assignment to a slot 51 within a slice object. Each slice object 291 defines an angular region around the circumference of the compass 82. Those slots 292 appearing within the slice object 291 are identified. A spine label 293 is assigned to the slot 292 corresponding to the cluster spine having the closest angularity to the slot 292.

Alternate User Interface

Figure 16:
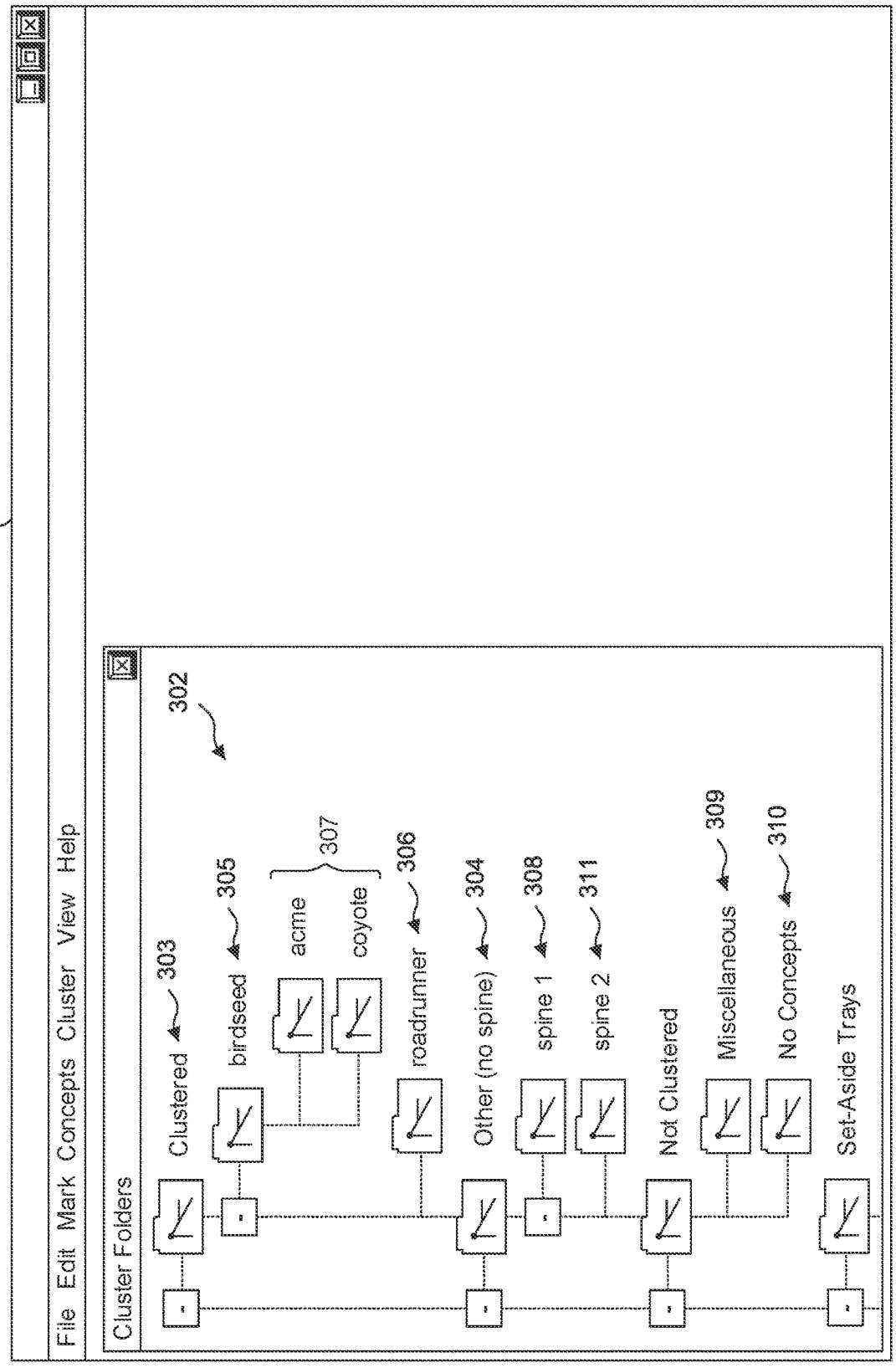
FIGS. 16 and 17 are screen display diagrams showing, by way of example, an alternate user interface generated by the display generator of FIG. 1.
Figure 17:
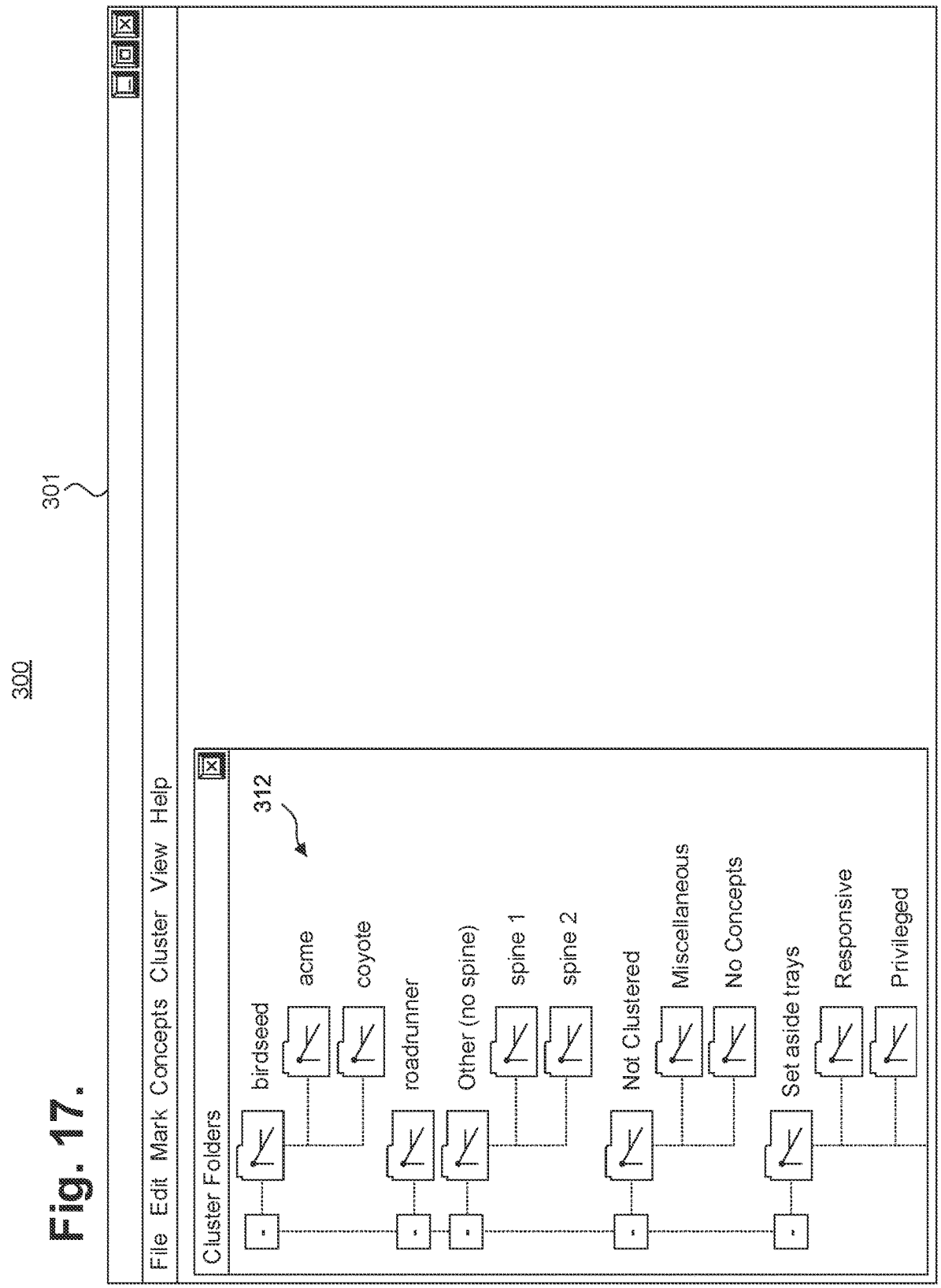

FIGS. 16 and 17 are screen display diagrams 300 showing, by way of example, an alternate user interface 301 generated by the display generator 34 of FIG. 1. Referring first to FIG. 16, in a further embodiment, the alternate user interface 301 includes a navigable folder representation of the three-dimensional space 62 projected onto a two-dimensional space 63 (shown in FIG. 3). Cluster data is presented within the user interface 301 in a hierarchical tree representation of folders 302. Cluster data is placed within the user interface 301 using "Clustered" folders 303 that contain one or more labeled spine group folders 305, 306, such as "birdseed" and "roadrunner." Where applicable, the spine group folders can also contain one or more labeled best fit spine group folders 307, such as "acme" and "coyote." In addition, uncategorized cluster data is placed within the user interface 301 using "Other" folders 304 that can contain one or more labeled "No spine" folders 308, which contain one or more labeled folders 311 for placed clusters 83 that are not part of a spine group, such as "dynamite." The "Other folders" 304 can also contain a "Miscellaneous" folder 309 and "Set-Aside Trays" folder 310 respectively containing clusters that have not been placed or that have been removed from the displayed scene. Conventional folder controls can enable a user to navigate, explore and search the cluster data 83. Other shapes and configurations of navigable folder representations are possible.

The folders representation 302 in the alternate user interface 301 can be accessed independently from or in conjunction with the two-dimensional cluster view in the original user interface 81. When accessed independently, the cluster data is presented in the folders representation 302 in a default organization, such as from highest scoring spine groups on down, or by alphabetized spine groups. Other default organizations are possible. When accessed in conjunction with the two-dimensional cluster view, the cluster data currently appearing within the focus area of the compass 82 is selected by expanding folders and centering the view over the folders corresponding to the cluster data in focus. Other types of folder representation access are possible.

Referring next to FIG. 17, the user interface 301 can also be configured to present a "collapsed" hierarchical tree representation of folders 312 to aid usability, particularly where the full hierarchical tree representation of folders 302 includes several levels of folders. The tree representation 312 can include, for example, only two levels of folders corresponding to the spine group folders 305, 306 and labeled best fit spine group folders 307. Alternatively, the tree representation could include fewer or more levels of folders, or could collapse top-most, middle, or bottom-most layers. Other alternate hierarchical tree representations are possible.

Figure 18:
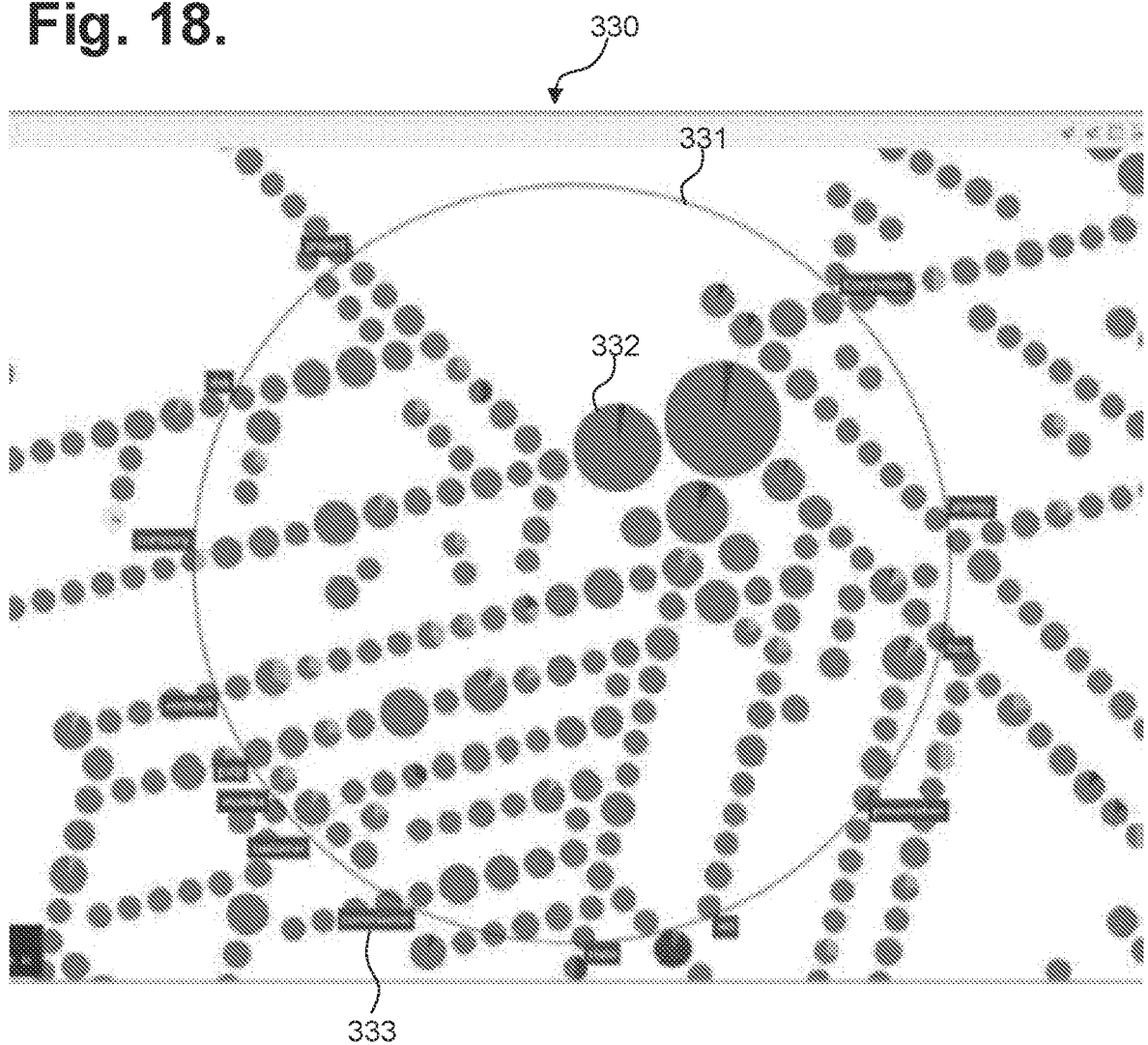
FIG. 18 is a screenshot showing, by way of example, a coding representation for each cluster.

FIG. 18 is a screenshot showing, by way of example, a coding representation 330 for each cluster. Each cluster 332 of documents is displayed as a pie graph. Specifically, the pie graph can identify classification codes assigned to documents in that cluster, as well as a frequency of occurrence of each assigned classification code. The classification codes can include "privileged," "responsive," or "non-responsive," however, other classification codes are possible. A "privileged" document contains information that is protected by a privilege, meaning that the document should not be disclosed or "produced" to an opposing party. Disclosing a "privileged" document can result in an unintentional waiver of the subject matter disclosed. A "responsive" document contains information that is related to the legal matter, while a "non-responsive" document includes information that is not related to the legal matter. The classification codes can be assigned to the documents via an individual reviewer, automatically, or as recommended and approved.

Each classification code can be assigned a color. For instance, privileged documents can be associated with the color red, responsive with blue, and non-responsive with white. A number of documents assigned to one such classification code is totaled for each of the classification codes and used to generate a pie chart based on the total number of documents in the cluster. Thus, if a cluster has 20 documents and five documents are assigned with the privileged classification code and two documents with the non-responsive code, then 25% of the pie chart would be colored red, 10% would be colored white, and if the remaining documents have no classification codes, the remainder of the pie chart can be colored grey. However, other classification codes, colors, and representations of the classification codes are possible.

In one embodiment, each portion of the pie, such as represented by a different classification code or no classification code, can be selected to provide further information about the documents associated with that portion. For instance, a user can select the red portion of the pie representing the privileged documents, which can provide a list of the privileged documents with information about each document, including title, date, custodian, and the actual document or a link to the actual document. Other document information is possible.

The display can include a compass 331 that provides a focused view of the clusters 332, concept labels 333 that are arranged circumferentially and non-overlappingly around the compass, and statistics about the clusters appearing within the compass. In one embodiment, the compass is round, although other enclosed shapes and configurations are possible. Labeling is provided by drawing a concept pointer from the outermost cluster to the periphery of the compass at which the label appears. Preferably, each concept pointer is drawn with a minimum length and placed to avoid overlapping other concept pointers. Focus is provided through a set of zoom, pan and pin controls In a further embodiment, a user can zoom into a display of the clusters, such as by scrolling a mouse, to provide further detail regarding the documents. For instance, when a certain amount of zoom has been applied, the pie chart representation of each cluster can revert to a representation of the individual documents, which can be displayed as circles, such as described above with reference to FIGS.

4A-C and 6A-C. In one embodiment, the zoom can be measured as a percentage of the original display size or the current display size. A threshold can then be applied to the percentage of zoom and if the zoom exceeds the threshold, the cluster representations can revert to the display of individual documents, rather than a pie chart.

Figure 19:
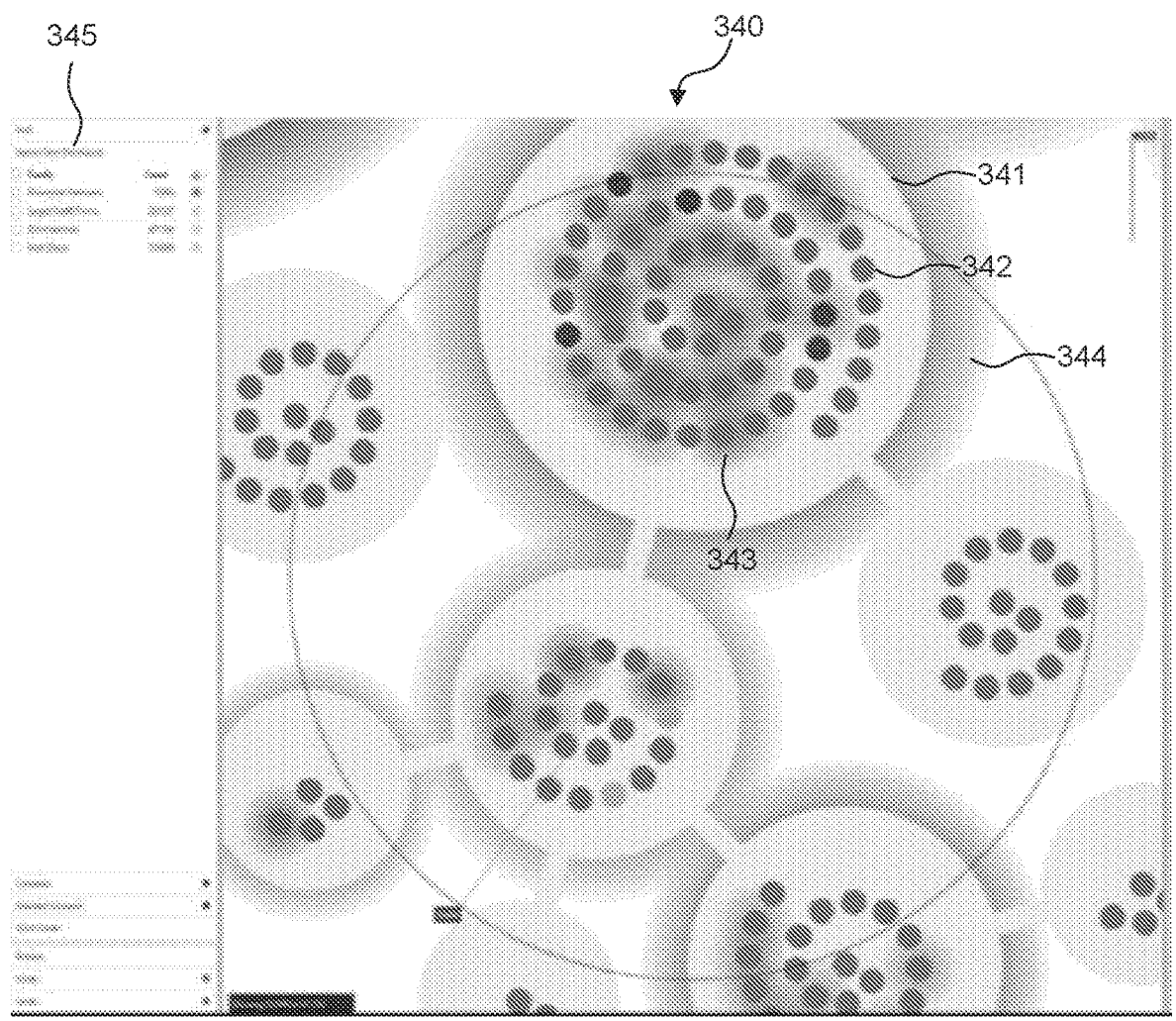
FIG. 19 is a screenshot showing, by way of example, document clusters with keyword highlighting.

FIG. 19 is a screenshot 340 showing, by way of example, document clusters 341 with keyword highlighting. A display of document clusters 341 can show individual documents 342 within one such cluster, where each document is represented as a circle. Each of the documents can be colored based on a classification code assigned to that document, such as automatically, by an individual reviewer, or based on a recommendation, which is approved by an individual. For example, privileged documents can be colored red, while responsive documents can be colored blue, and non-responsive documents can be colored light blue.

The cluster display can include one or more search fields into which search terms 345 can be entered. The search terms can be agreed upon by both parties subject to a case under litigation, a document reviewer, an attorney, or other individual associated with the litigation case. Allowing a user to search the documents for codes helps that user to easily find relevant documents via the display. Additionally, the search provides a display based on what the user thinks is important based on search terms provided and what the system thinks is important based on how the documents are clustered and the classification codes are assigned. In one example, the display can resemble a heat map with a "glow" or highlighting 344 provided around one or more representations of the documents and clusters, as described below.

Once the search terms are entered, a search is conducted to identify those documents related to the search terms of interest. Prior to or during the search, each of the search terms are associated with a classification code based on the documents displayed. For instance, based on a review of the documents for each classification code, a list of popular or relevant terms across all the documents for that code are identified and associated with that classification code. For example, upon review of the privileged document, terms for particular individuals, such as the attorney name and CEO name are identified as representative of the privileged documents. Additionally, junk terms can be identified, such as those terms frequently found in junk email, mail, and letters. For example, certain pornographic terms may be identified as representative of junk terms.

Upon identification of the documents associated with the search terms, a color 343 is provided around the document based on the search term to which the document is related or includes. The colors can be set by attorneys, administrators, reviewers, or set as a default. For example, a document that includes the CEO's name would be highlighted red, such as around the red circle if the document is associated with the classification code of privileged. Alternatively, if the circle representing the document is colored blue for responsive, the red color for the search term is colored around the blue circle. The strength of the highlighted color, including darker or lighter, can represent a relevance of the highlighted document or concept to the search terms. For example, a document highly related to one or more of the search terms can be highlighted with a dark color, while a document with lower relevance can be associated with a lighter highlighted color.

When the document color and the search term highlight colors match, an agreement between what the user believes to be important matches with what the system identifies to be important. However, if the colors do not match, a discrepancy may exist between the user and the system and documents represented by disparate colors may require further review by the user. Alternatively, one or more junk terms can be entered as the search terms to identify those documents that are likely "junk" and to ensure that those documents are not coded as privileged or responsive, but if so, the user can further review those documents. Further, clusters that do not include any documents related to the search terms can also be highlighted a predetermined color.

In addition to the documents, a cluster can also include a highlighting 343 around the cluster based on a relevance of that cluster to the search terms. The relevance can be based on all the documents in that cluster. For instance, if 20 of the documents are related to a privileged term and another is related to a non-responsive term, the cluster can be highlighted around the cluster circle with the color red to represent the privileged classification. Additionally, if each document related to a privileged term and is also coded as privileged, there is a strong agreement that the cluster correctly includes privileged documents.

In a further embodiment, the search terms can be used to identify documents, such as during production to fulfill a production request. In a first scenario, the search terms are provided and a search is conducted. Based on the number of terms or the breadth of the terms, few documents may be identified as relevant to the search terms. Additionally, the search terms provided may not be representative of the results desired by the user. Therefore, in this case, the user can review terms or concepts of a responsive cluster and enter the further terms to conduct a further search based on the new terms. A responsive cluster can include those clusters with documents that are highlighted based on the search terms and considered relevant to the user.

Alternatively, if the terms are overly broad, a large number of documents will show highlighting as related to the terms and the results may be over-inclusive of documents that have little relevance to the actual documents desired by the user. The user can then identify non-responsive clusters with highlighted documents not desired by the user to identify terms having false positives, such that they appear relevant to the search terms. The user can then add exclusionary terms to the search, remove or replace one or more of the terms, and add a new term to narrow the search for desired documents. To identify new terms or replace terms, a user can review the terms or concepts of a responsive cluster. The search terms can include Boolean features and proximity features to conduct the search. For example, the search terms for "fantasy," "football," and "statistics" may provide over-inclusive results. A user then looks at responsive clusters to identify a concept for "gambling" and conducts a new search based on the four search terms. The terms or concepts can be identified from one or more documents or from the cluster labels.

A list of the search terms can be provided adjacent to the display with a number of documents or concepts identified in the display as relevant to that search term. Fields for concepts, selected concepts, quick codes, blinders, issues, levels, and saved searches can also be provided.

Figure 20:
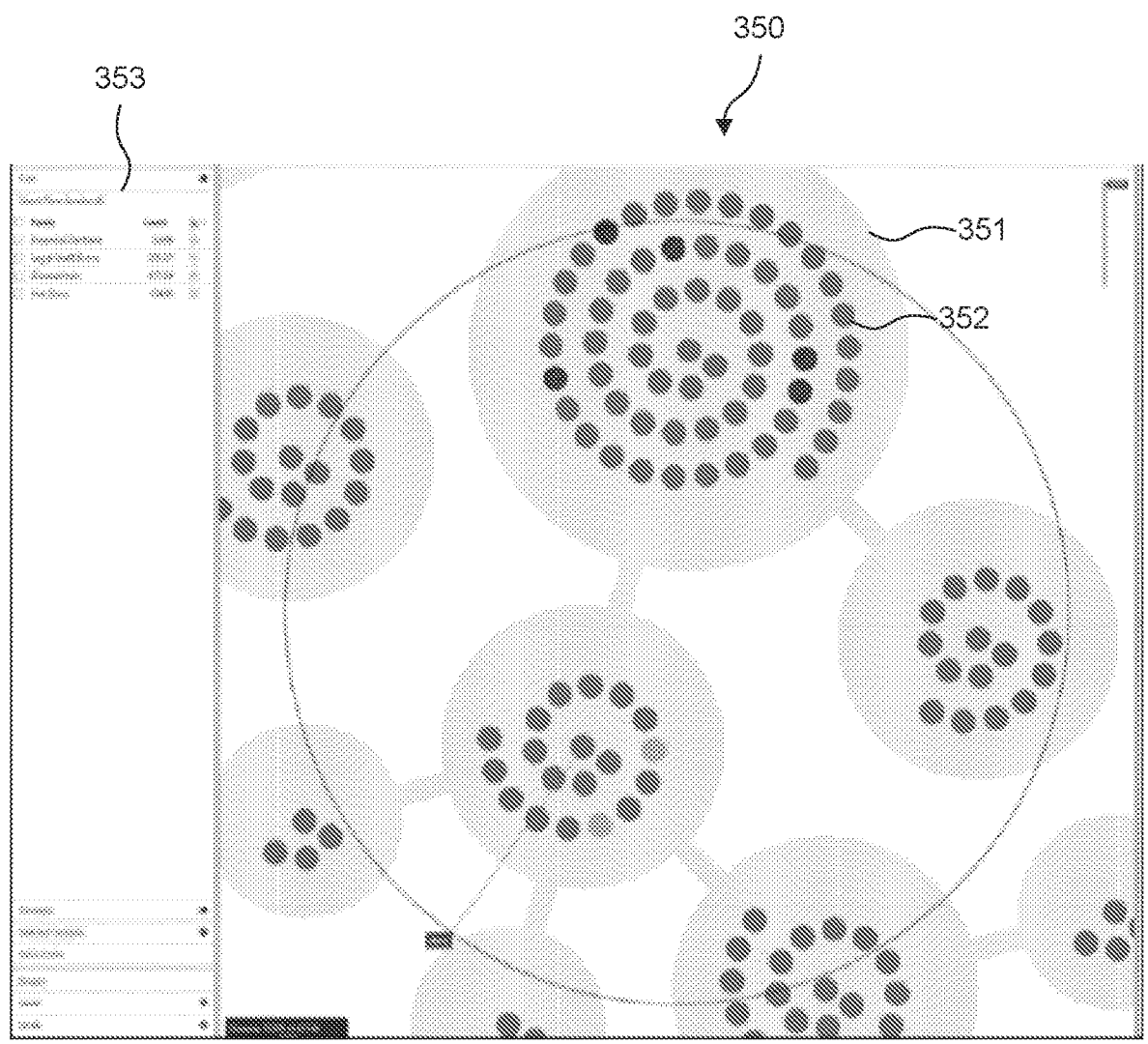
FIG. 20 is a screenshot showing, by way of example, documents clusters without search term highlighting.

FIG. 20 is a screenshot 350 showing, by way of example, documents clusters 351 without search term highlighting. The search term highlighting feature can be turned off with a single click to reduce noise in the display. Massive amounts of data can be available and may be too much data to reasonably display at a single time. Accordingly, the data can be prioritized and divided to display reasonable data chunks at a single time. In one example, the data can be prioritized based on user-selected factors, such as search term relation, predictive coding results, date, code, or custodian, as well as many other factors. Once one or more of the factors are selected, the documents 352 in a corpus are prioritized based on the selective factor. Next, the documents are ordered based on the prioritization, such as with the highest priority document at a top order and the lowest priority document at the bottom. The ordered documents can then be divided into bins of predetermined sizes, randomly selected sizes, or as needed sizes. Each bin can have the same or a different number of documents. The documents in each bin are then provided as one page of the cluster display.

The documents are divided by family, such that a bin will include documents of the same family. For example, an original email will include in its family, all emails in the same thread, such as reply and forwarded emails, and all attachments. The cluster display is dependent on the documents in each bin. For instance, the bin number may be set at 10,000 documents. If a single cluster includes 200 documents and 198 of the documents are prioritized with numbers before 10,000 and the remaining two documents have priorities over 10,000, then the cluster will be displayed as a first page with the 198 documents, but not the two documents of lower priority. In one embodiment, the two documents may show as a cluster together on the page corresponding with the bin to which the two documents belong. The next page will provide a cluster display of the next 10,000 documents, and so on. In this manner, the user can review the documents based on priority, such that the highest priority documents will be displayed first. A list 353 of pages can be provided at a bottom of the display for the user to scroll through.

In a further example, the displays are also dependent on the prioritized documents and their families. For instance, one or more of the first 10,000 prioritized documents, may have additional family members, which can change the number of documents included in a bin, such as to 10,012.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for displaying multi-dimensional clusters of documents on a two-dimensional screen, the system including one or more a programmed digital computing devices configured to execute computer code to implement a plurality of components, comprising:
   a clustering component to form, in a three-dimensional cluster space, a plurality of clusters comprising one or more documents,
      each cluster of the plurality of clusters having an associated cluster concept,
      each document having an associated concept score, and
      each document assigned to a cluster based on the concept score;
   a cluster spine placement component to map each cluster to a corresponding cluster spine from a plurality of spines, such that each spine comprises a group of clusters sharing a concept; and
   a display generator component to generate a visualization of the clusters and spines in two-dimensional space for projection onto a two-dimensional display, and to generate a heads-up display for projection onto a two-dimensional display, the heads-up display including:
      a compass logically framing the cluster spines, the compass including a plurality of slots positioned circumferentially around the compass, and
      a plurality of labels, each label of the plurality of labels indicating the associated cluster concept for a corresponding spine; and
      a concept pointer from each label to its corresponding spine from among of the plurality of spines.

2. The computer-implemented system of claim 1, wherein the compass further comprises plurality of slots positioned circumferentially around the compass, each cluster spine displayed within a corresponding slot, and each label disposed within a slot corresponding to its associated spine.

3. The computer-implemented system as described in claim 1, wherein at least one spine comprises a plurality of clusters arranged linearly.

4. The computer-implemented system as described in claim 1, wherein the clusters and spines are displayed in three-dimensional space.

5. The computer-implemented system as described in claim 1, wherein the concept score is generated from one or both of concepts and terms extracted from the documents.

6. The computer-implemented system as described in claim 1, wherein the compass logically separates cluster spines into a focused area displaying some of the cluster spines, and an unfocused area displaying remaining cluster spines, and wherein each concept pointer extends from a label to a corresponding cluster spine in the focused area.

7. The computer-implemented system as described in claim 1, wherein the heads-up display provides controls for one or more of navigating, exploring, and searching the visualization.

8. The computer-implemented system as described in claim 1, further comprising:
   a division module to divide the display of clusters, comprising:
      a priority module to prioritize documents;
      an order module to order the documents based on the prioritization;
      a bin classification module to divide the ordered documents into bins; and
      a bin display module to separately display the documents associated with each bin.

9. A computer-implemented method for displaying multi-dimensional clusters of documents, the method comprising:
   forming a plurality of clusters of one or more documents,
   associating with each cluster a cluster concept,
   associating with each document a cluster concept score;
   assigning each document to a cluster based on the document's concept score;
   mapping each cluster to a corresponding cluster spine from a plurality of spines, such that each spine comprises a group of clusters sharing a concept;
   displaying a heads-up display, the heads-up display comprising:
      a visualization showing the clusters and spines and
      a compass logically framing the cluster spines, the compass including a plurality of slots positioned circumferentially around the compass, and
      a plurality of labels, each label of the plurality of labels indicating the associated cluster concept for a corresponding spine; and
      a concept pointer from each label to its corresponding spine from among of the plurality of spines.

10. The computer-implemented method as described in claim 9, wherein the clusters and spines are displayed in two-dimensional space for projection onto a two-dimensional display.

11. The computer-implemented method as described in claim 9, wherein the clusters and spines are displayed in three-dimensional space.

12. The computer-implemented method as described in claim 9, wherein the concept score is generated from one or both of concepts and terms extracted from the documents.

13. The computer-implemented method as described in claim 9, wherein the compass logically separates cluster spines into a focused area displaying some of the cluster spines, and an unfocused area displaying remaining cluster spines, and wherein each concept pointer extends from a label to a corresponding cluster spine in the focused area.

14. The method as described in claim 9, wherein the heads-up display provides controls for one or more of navigating, exploring, and searching the visualization.

15. The computer-implemented method as described in claim 9, further comprising:
dividing the display of clusters via a division module, the division module comprising:
a priority module to prioritize documents;
ordering the documents based on the prioritization via an ordering module;
dividing the ordered documents into bins; and
separately displaying the documents associated with each bin.

16. A non-volatile computer-readable storage medium having computer-executable code thereon, the computer code, when executed by a computer processor, causing a computer to perform a method for displaying multi-dimensional clusters of documents on a two-dimensional screen, the code comprising:
code for forming, in a three-dimensional cluster space, a plurality of clusters comprising one or more documents,
each cluster of the plurality of clusters having an associated cluster concept,
each document having an associated concept score, and
each document assigned to a cluster based on the concept score;
code for mapping each cluster to a corresponding cluster spine from a plurality of spines, such that each spine comprises a group of clusters sharing a concept; and
code for generating a visualization of the clusters and spines in two-dimensional space for projection onto a two-dimensional display, and for generating a heads-up display for projection onto a two-dimensional display, the heads-up display including:
a compass logically framing the cluster spines, the compass including a plurality of slots positioned circumferentially around the compass, and
a plurality of labels, each label of the plurality of labels indicating the associated cluster concept for a corresponding spine; and
a concept pointer from each label to its corresponding spine from among of the plurality of spines.

17. The non-volatile computer-readable storage medium of claim 16, wherein the compass further comprises plurality of slots positioned circumferentially around the compass, each cluster spine displayed within a corresponding slot, and each label disposed within a slot corresponding to its associated spine.

18. The non-volatile computer-readable storage medium of claim 16, wherein the concept score is generated from one or both of concepts and terms extracted from the documents.

19. The non-volatile computer-readable storage medium of claim 16, wherein the compass logically separates cluster spines into a focused area displaying some of the cluster spines, and an unfocused area displaying remaining cluster spines, and wherein each concept pointer extends from a label to a corresponding cluster spine in the focused area.

20. The non-volatile computer-readable storage medium of claim 16, wherein the heads-up display provides controls for one or more of navigating, exploring, and searching the visualization.

* * * * *

UNITED STATES PATENT AND TRADEMARK OFFICE
CERTIFICATE OF CORRECTION

PATENT NO. : 12,135,750 B2
APPLICATION NO. : 18/230606
DATED : November 5, 2024
INVENTOR(S) : Joe Milan et al.

Page 1 of 1

It is certified that error appears in the above-identified patent and that said Letters Patent is hereby corrected as shown below:

In the Claims

At Column 19, Claim number 1, Line number 45, please delete "a" between "more" and "programmed"

Signed and Sealed this
Fourth Day of February, 2025

Coke Morgan Stewart
*Acting Director of the United States Patent and Trademark Office*